(12) United States Patent
Chen et al.

(10) Patent No.: US 12,401,817 B2
(45) Date of Patent: Aug. 26, 2025

(54) METHODS FOR PERFORMING WRAP-AROUND MOTION COMPENSATION

(71) Applicant: ALIBABA GROUP HOLDING LIMITED, Grand Cayman (KY)

(72) Inventors: Jie Chen, Beijing (CN); Yan Ye, San Diego, CA (US); Ru-Ling Liao, Beijing (CN); Jiancong Luo, Skillman, NJ (US)

(73) Assignee: Alibaba Group Holding Limited, Grand Cayman (KY)

( * ) Notice: Subject to any disclaimer, the term of this patent is extended or adjusted under 35 U.S.C. 154(b) by 3 days.

(21) Appl. No.: 18/590,150

(22) Filed: Feb. 28, 2024

(65) Prior Publication Data
US 2024/0205447 A1   Jun. 20, 2024

Related U.S. Application Data

(63) Continuation of application No. 18/067,166, filed on Dec. 16, 2022, now Pat. No. 11,956,463, which is a
(Continued)

(51) Int. Cl.
*H04N 19/176*   (2014.01)
*H04N 19/186*   (2014.01)
(Continued)

(52) U.S. Cl.
CPC ......... *H04N 19/513* (2014.11); *H04N 19/176* (2014.11); *H04N 19/186* (2014.11); *H04N 19/46* (2014.11)

(58) Field of Classification Search
CPC .... H04N 19/176; H04N 19/186; H04N 19/46; H04N 19/513; H04N 19/597; H04N 19/70
See application file for complete search history.

(56) References Cited

U.S. PATENT DOCUMENTS

| | | | |
|---|---|---|---|
| 2011/0194613 A1* | 8/2011 | Chen | H04N 19/176 375/E7.2 |
| 2013/0208788 A1 | 8/2013 | Chen et al. | |

(Continued)

FOREIGN PATENT DOCUMENTS

| | | |
|---|---|---|
| CN | 112997501 A | 6/2021 |
| JP | 2018534827 A | 11/2018 |

(Continued)

OTHER PUBLICATIONS

Japanese Office Action issued in corresponding Japanese Application No. 2022-532786 on Dec. 26, 2025 (6 pages).
(Continued)

*Primary Examiner* — Md N Haque
(74) *Attorney, Agent, or Firm* — Finnegan, Henderson, Farabow, Garrett & Dunner, LLP

(57) ABSTRACT

A method for performing motion compensation includes: receiving a first wrap-around motion compensation flag associated with one or more pictures, and a second wrap-around motion compensation flag associated with a sequence of pictures; and determining whether the first wrap-around motion compensation flag is equal to a first value or a second value based on the second wrap-around motion compensation flag or a luma coding tree block size: when the second wrap-around motion compensation flag is equal to the second value, determining the first wrap-around motion compensation flag equal to the second value, or when the luma coding tree block size in unit of minimum coding block plus 1 is greater than a picture width in unit of minimum coding block minus 1, determining the first wrap-around motion compensation flag is equal to the second value.

20 Claims, 35 Drawing Sheets

--- pps_ref_wraparound_enabled_flag equal to 1 specifies that horizontal wrap-around motion compensation is applied in inter prediction. pps_ref_wraparound_enabled_flag equal to 0 specifies that horizontal wrap-around motion compensation is not applied. When sps_ref_wraparound_enabled_flag equals to 0 or the value of ( CtbSizeY / MinCbSizeY + 1) is larger than ( pic_width_in_luma_samples / MinCbSizeY − 1 ), pps_ref_wraparound_enabled_flag shall be 0, *otherwise pps_ref_wraparound_enabled_flag shall be equal to 1.*

--- pps_ref_wraparound_offset plus *( CtbSizeY / MinCbSizeY )* + 2 specifies the value of offset used for computing the horizontal wrap-around position in units of MinCbSizeY luma samples. When present, the value of pps_ref_wraparound_offset shall be in the range of *0* to ( pic_width_in_luma_samples / MinCbSizeY ) − *( CtbSizeY / MinCbSizeY )* − 2, inclusive.

---

PicRefWraparoundOffset = pps_ref_wraparound_offset + ( CtbSizeY / MinCbSizeY ) + 2

Related U.S. Application Data continuation of application No. 17/124,831, filed on Dec. 17, 2020, now Pat. No. 11,711,537.

(60) Provisional application No. 62/949,396, filed on Dec. 17, 2019.

(51) Int. Cl.
  *H04N 19/46* (2014.01)
  *H04N 19/513* (2014.01)

(56) References Cited

U.S. PATENT DOCUMENTS

| | | | |
|---|---|---|---|
| 2015/0256841 A1 | 9/2015 | Yie et al. | |
| 2017/0085917 A1 | 3/2017 | Hannuksela | |
| 2017/0188032 A1* | 6/2017 | Rossato | H04N 19/59 |
| 2019/0253622 A1 | 8/2019 | Van der Auwera et al. | |
| 2019/0281322 A1 | 9/2019 | Laroche et al. | |
| 2020/0154139 A1* | 5/2020 | Hannuksela | H04N 19/136 |
| 2020/0213617 A1* | 7/2020 | Choi | H04N 19/119 |
| 2021/0029371 A1* | 1/2021 | Seregin | H04N 19/176 |
| 2021/0029374 A1 | 1/2021 | Zhang et al. | |
| 2021/0092447 A1* | 3/2021 | Choi | H04N 19/46 |
| 2021/0160482 A1* | 5/2021 | Chiu | H04N 19/59 |
| 2021/0203988 A1 | 7/2021 | Chang et al. | |
| 2021/0211706 A1 | 7/2021 | Choi et al. | |
| 2022/0007053 A1 | 1/2022 | Hanhart et al. | |
| 2022/0038737 A1 | 2/2022 | He et al. | |

FOREIGN PATENT DOCUMENTS

| | | |
|---|---|---|
| KR | 20210080358 A | 9/2019 |
| WO | WO 2020/069058 A1 | 4/2020 |

OTHER PUBLICATIONS

Bross et al., "Versatile Video Coding (Draft 6)," JVET-O2001-vE, 15th Meeting: Gothenburg, SE, Jul. 3-12, 2019, 475 pages.
First Office Action issued in corresponding Chinese Application No. 202080087927.7 on Aug. 22, 2024, 2024 (6 pages).
"Requirements for a Future Video Coding Standard v5," International Organisation for Standardisation, Torino, IT, 14 pages (2017).
Brian Heng et al. "AHG16/AHG8: Proposed Cleanup for Reference Wraparound," Joint Video Experts Teams (JVET) of ITU-T, 14th Meeting: Geneva, CH, pp. 1-8 (2019).
Bross et al., "Versatile Video Coding (Draft 8)," JVET-Q2001-vD, 17th Meeting: Brussels, BE, Jan. 7-17, 2020, 509 pages.
Chen et al., "Algorithm Description of Joint Exploration Test Model 7 (JEM 7)," JVET-G1001-v1, $7^{th}$ Meeting: Torino, IT, Jul. 13-21, 2017, 50 pages.
Chen et al., "Algorithm Description of Joint Exploration Test Model 8 (JEM 8)," JVET-Q2002-v1, $17^{th}$ Meeting: Brussels, BE, Jan. 7-17, 2020, 91 pages.
Hanhart et al., "AHG8: Horizontal geometry padding for PERP," JVET-K0333, $11^{th}$ Meeting: Ljubljana, SI, Jul. 10-18, 2018, 4 pages.
Hanhart et al., "CE13: Perp with horizontal geometry padding of reference pictures (Test 3.3)," JVET-L0231, 2018, 11 pages.
International Organisation for Standardisation "Requirements for a Future Video Coding Standard v5," N17074, Torino, IT. pp. 1-13 (2017).
International Telecommunications Union "Series H: Audiovisual and Multimedia Systems Infrastructure of audiovisual services—Coding of moving video", ITU-T Telecommunication Standardization Sector of ITU, Apr. 2013, 317 pages.
Jem, https://jvet.hhi.fraunhofer.de/syn/syn_HMJEMSoftware.
Jill M. Boyce et al. "EE4: Padded ERP (PERP) project format," Joint Video Exploration Team (JVET), $7^{th}$ Meeting: Torino IT, JVET-G0098, pp. 1-11 (2018).
Nister et al., "Visual Odometry," Proceedings of the 2004 IEEE Computer Society Conference on Computer Vision and Pattern Recognition, 10 pages, 2004.
PCT International Search Report and Written Opinion mailed Jun. 9, 2021, issued in corresponding International Application No. PCT/US2021/024447 (8 pgs.).
PCT International Search Report and Written Opinion mailed Mar. 23, 2021, issued in corresponding International Application No. PCT/US2020/065515 (13 pgs.).
Philippe Hanhart et al. "AHG8: Horizontal geometry padding for PERP," Joint Video Experts Team (JVET) of ITU-T, 11th Meeting: Ljubjana, SI, pp. 1-4 (2018).
Philippe Hanhart et al. "JVET common test conditions and evaluation procedures for 360-degree video," Joint Video Exploration Team (JVET) of ITU-T, 12th Meeting: Macau, CN, pp. 1-7 (2018).
Sullivan et al., "Overview of the High Efficiency Video Coding (HEVC) Standard," IEE Transactions on Circuits and Systems for Video Technology, vol. 22, No. 12, pp. 1649-1668 (2012).
Yan Ye et al. "Algorithm descriptions of projection format conversion and video quality metrics in 350Lib Version 9" Joint Video Exploration Team (JVET) of ITU-T, 13th Meeting: Marrakech, MA, pp. 1-47 (2019).
Zhou et al. "AHG8: Unrestricted Motion Compensation for 360 Video in ERP Format," JVET-E0065, $5^{th}$ Meeting: Geneva, CH, Jan. 12-20, 2017, 3 pages.
Bross et al., "Versatile Video Coding (Draft 7)," JVET-P2001-V9, $16^{th}$ Meeting: Geneva, CH, Oct. 1-11, 2019, 491 pages.
Bross et al., "Versatile Video Coding (Draft 7)," JVET-P2001-VE, $16^{th}$ Meeting: Geneva, CH, Oct. 1-11, 2019, 489 pages.
Chen et al., "AHG8/AHG9: On horizontal wrap-around motion compensation," JVET-Q0416-v1, $17^{th}$ Meeting: Brussels, BE, Jan. 7-17, 2020, 8 pages.
Chen et al., "Algorithm description for Versatile Video Coding and Test Model 7 (VTM 7)," JVET-P2002-v1, $16^{th}$ Meeting: Geneva, CH, Oct. 1-11, 2019, 90 pages.
Choi et al., "AHG9: Text for combination of wrap around offset and RPR," JVET-Q0764, $17^{th}$ Meeting: Brussels, BE, Jan. 7-17, 2020, 2 pages.
European Patent Office Communication issued for Application No. 20901172.5 which encloses the extended European Search Report which includes pursuant to Rule 62 EPC, the Supplementary European Search Report (Art. 153(7) EPC) and the European search opinion, dated Jan. 3, 2023, 12 pages.
Sullivan et al., Meeting Report of the $17^{th}$ Meeting of the Joint Video Experts Team (JVET), Brussels, BE, Jan. 7-17, 2020,: JVET-Q2000-v1, $17^{th}$ Meeting: Brussels, BE, Jan. 7-17, 2020, 378 pages.

* cited by examiner

| seq_parameter_set_rbsp( ) { | Descriptor |
|---|---|
| ... | |
|     sps_ref_wraparound_enabled_flag | u(1) |
|     if( sps_ref_wraparound_enabled_flag ) | |
|         sps_ref_wraparound_offset_minus1 | ue(v) |
| ... | |

FIG. 7 sps_ref_wraparound_enable_flag equal to 1 indicates that horizontal wrap-around motion compensation is applied in inter prediction. sps_ref_wraparound_enabled_flag equal to 0 specifies that horizontal wrap-around motion compensation is not applied. When the value of ( CtbSizeY / MinCbSizeY + 1 ) is larger than ( pic_width_in_luma_samples / MinCbSizeY − 1 ), where pic_width_in_luma_samples is the value of pic_width_in_luma_samples in any PPS that refers to the SPS, the value of sps_ref_wraparound_enabled_flag shall be equal to 0.

sps_ref_wraparound_offset_minus1 plus 1 specifies the offset used for computing the horizontal wrap-around position in units of MinCbSizeY luma samples. The value of ref_wraparound_offset_minus1 shall be in the range of ( CtbSizeY / MinCbSizeY ) + 1 to ( pic_width_in_luma_samples / MinCbSizeY ) − 1, inclusive, where pic_width_in_luma_samples is the value of pic_width_in_luma_samples in any PPS that refers to the SPS.

FIG. 8

| seq_parameter_set_rbsp( ) { | Descriptor |
|---|---|
| ... | |
| sps_ref_wraparound_enabled_flag | u(1) |
| if( sps_ref_wraparound_enabled_flag ) | |
|     sps_ref_wraparound_offset | ue(v) |
| ... | |

FIG. 9 sps_ref_wraparound_enable_flag equal to 1 indicates that horizontal wrap-around motion compensation is applied in inter prediction. sps_ref_wraparound_enabled_flag equal to 0 specifies that horizontal wrap-around motion compensation is not applied. When the value of ( CtbSizeY / MinCbSizeY + 1 ) is larger than ( pic_width_in_luma_samples / MinCbSizeY − 1 ), where pic_width_in_luma_samples is the value of pic_width_in_luma_samples in any PPS that refers to the SPS, the value of sps_ref_wraparound_enabled_flag shall be equal to 0.

sps_ref_wraparound_offset plus ( *CtbSizeY / MinCbSizeY* ) + 2 specifies the offset used for computing the horizontal wrap-around position in units of MinCbSizeY luma samples. The value of sps_ref_wraparound_offset shall be in the range of *0* to ( pic_width_in_luma_samples / MinCbSizeY ) − ( *CtbSizeY / MinCbSizeY* ) − 2, inclusive, where pic_width_in_luma_samples is the value of pic_width_in_luma_samples in any PPS that refers to the SPS.

FIG. 10 sps_ref_wraparound_enable_flag equal to 1 indicates that horizontal wrap-around motion compensation is applied in inter prediction. sps_ref_wraparound_enabled_flag equal to 0 specifies that horizontal wrap-around motion compensation is not applied. ~~When the value of ( CtbSizeY / MinCbSizeY + 1 ) is larger than ( pic_width_in_luma_samples / MinCbSizeY − 1 ), where pic_width_in_luma_samples is the value of pic_width_in_luma_samples in any PPS that refers to the SPS, the value of sps_ref_wraparound_enabled_flag shall be equal to 0.~~ sps_ref_wraparound_offset_minus1 plus 1 specifies the offset used for computing the horizontal wrap-around position in units of MinCbSizeY luma samples. The value of ref_wraparound_offset_minus1 shall be in the range of ( CtbSizeY / MinCbSizeY ) + 1 to ( *pic_width_max_in_luma_samples* / MinCbSizeY ) − 1, inclusive, ~~where pic_width_in_luma_samples is the value of pic_width_in_luma_samples in any PPS that refers to the SPS.~~

FIG. 11

| |
|---|
| PicRefWraparoundEnableFlag = sps_ref_wraparound_enabled_flag && ((CtbSizeY / MinCbSizeY + 1) <= ( pic_width_in_luma_samples / MinCbSizeY − 1 )), |
| PicRefWraparoundOffset = min (sps_ref_wraparound_offset_minus1+1, ( pic_width_in_luma_samples / MinCbSizeY )) |

FIG. 12

| | | | |
|---|---|---|---|
| xInt$_i$ = Clip3 ( 0, picW − 1, PicRefWraparoundEnableFlag ? ClipH( PicRefWraparoundOffset * MinCbSizeY, picW, xIntL ) : xInt + i ) | | | |
| yInti = Clip3 ( 0, picH − 1, yInt + i ) | | | |
| Clip3( x, y, z ) | = x   if z < x <br> = y   if z > y <br> = z   otherwise | | |
| ClipH( o, W, x ) | = x + o   if x < 0 <br> = x − o   if x > W − 1 <br> = x      otherwise | | |

FIG. 13

| seq_parameter_set_rbsp( ) { | Descriptor |
|---|---|
| ... | |
|    sps_ref_wraparound_enabled_flag | u(1) |
|    ~~if( sps_ref_wraparound_enabled_flag )~~ | |
|       ~~sps_ref_wraparound_offset_minus1~~ | ~~ue(v)~~ |
| ... | |

| pic_parameter_set_rbsp( ) { | Descriptor |
|---|---|
| ... | |
|    pic_width_in_luma_samples | ue(v) |
|    pic_height_in_luma_samples | ue(v) |
|    *pps_ref_wraparound_offset* | ue(v) |
| ... | |

FIG. 14 sps_ref_wraparound_enabled_flag equal to 1 specifies that horizontal wrap-around motion compensation is applied in inter prediction. sps_ref_wraparound_enabled_flag equal to 0 specifies that horizontal wrap-around motion compensation is not applied. When the value of ( CtbSizeY / MinCbSizeY + 1) is less than or equal to ( pic_width_in_luma_samples / MinCbSizeY − 1 ), where pic_width_in_luma_samples is the value of pic_width_in_luma_samples in any PPS that refers to the SPS, the value of sps_ref_wraparound_enabled_flag shall be equal to 0.

pps_ref_wraparound_offset *plus 1* specifies the value of offset used for computing the horizontal wrap-around position in units of MinCbSizeY luma samples. When sps_ref_wraparound_enabled_flag equals to 0 or the value of ( CtbSizeY / MinCbSizeY + 1 ) is larger than ( pic_width_in_luma_samples / MinCbSizeY − 1 ), pps_ref_wraparound_offset shall be 0; otherwise the value of pps_ref_wraparound_offset shall be in the range of ( *CtbSizeY / MinCbSizeY* ) + *1* to ( pic_width_in_luma_samples / MinCbSizeY ) − *1*, inclusive.

FIG. 15

| seq_parameter_set_rbsp( ) { | Descriptor |
|---|---|
| ... | |
|     sps_ref_wraparound_enabled_flag | u(1) |
| ~~    if( sps_ref_wraparound_enabled_flag )~~ | |
| ~~        sps_ref_wraparound_offset_minus1~~ | ~~ue(v)~~ |
| ... | |

FIG. 16

| pic_parameter_set_rbsp( ) { | Descriptor |
|---|---|
| ... | |
|    pic_width_in_luma_samples | ue(v) |
|    pic_height_in_luma_samples | ue(v) |
|    *pps_ref_wraparound_offset* | ue(v) |
| ... | |

FIG. 17 sps_ref_wraparound_enabled_flag equal to 1 specifies that horizontal wrap-around motion compensation is applied in inter prediction. sps_ref_wraparound_enabled_flag equal to 0 specifies that horizontal wrap-around motion compensation is not applied. ~~When the value of ( CtbSizeY / MinCbSizeY + 1 ) is less than or equal to ( pic_width_in_luma_samples / MinCbSizeY — 1 ), where pic_width_in_luma_samples is the value of pic_width_in_luma_samples in any PPS that refers to the SPS, the value of sps_ref_wraparound_enabled_flag shall be equal to 0.~~ pps_ref_wraparound_offset_plus1 specifies the value of offset used for computing the horizontal wrap-around position in units of MinCbSizeY luma samples. When sps_ref_wraparound_enabled_flag is equals to 0 or the value of ( CtbSizeY / MinCbSizeY + 1 ) is larger than ( pic_width_in_luma_samples / MinCbSizeY − 1 ), pps_ref_wraparound_offset shall be 0; otherwise the value of pps_ref_wraparound_offset shall be in the range of *( CtbSizeY / MinCbSizeY )* + *1* to ( pic_width_in_luma_samples / MinCbSizeY ) − *1*, inclusive.

FIG. 18

| PicRefWraparoundEnableFlag = ( pps_ref_wraparound_offset != 0 ) |
| PicRefWraparoundOffset = pps_ref_wraparound_offset + ( CtbSizeY / MinCbSizeY ) + 1 |

FIG. 19

| seq_parameter_set_rbsp( ) { | Descriptor |
|---|---|
| ... | |
|    sps_ref_wraparound_enabled_flag | u(1) |
| ~~if( sps_ref_wraparound_enabled_flag )~~ | |
| ~~sps_ref_wraparound_offset_minus1~~ | ~~ue(v)~~ |
| ... | |

FIG. 20

| pic_parameter_set_rbsp( ) { | Descriptor |
|---|---|
| ... | |
|    pic_width_in_luma_samples | ue(v) |
|    pic_height_in_luma_samples | ue(v) |
|    *pps_ref_wraparound_enabled_flag* | ue(1) |
|    *if(pps_ref_wraparound_enabled_flag)* | |
|       *pps_ref_wraparound_offset* | ue(v) |
| ... | |

FIG. 21 sps_ref_wraparound_enabled_flag equal to 1 specifies that horizontal wrap-around motion compensation is applied in inter prediction. sps_ref_wraparound_enabled_flag equal to 0 specifies that horizontal wrap-around motion compensation is not applied. When the value of ( CtbSizeY / MinCbSizeY + 1 ) is less than or equal to ( pic_width_in_luma_samples / MinCbSizeY – 1 ), where pic_width_in_luma_samples is the value of pic_width_in_luma_samples in any PPS that refers to the SPS, the value of sps_ref_wraparound_enabled_flag shall be equal to 0.

pps_ref_wraparound_enabled_flag equal to *1* specifies that horizontal wrap-around motion compensation is applied in inter prediction. pps_ref_wraparound_enabled_flag equal to 0 specifies that horizontal wrap-around motion compensation is not applied. When sps_ref_wraparound_enabled_flag equals to 0 or the value of ( *CtbSizeY* / *MinCbSizeY* + *1* ) is larger than ( pic_width_in_luma_samples / *MinCbSizeY* – *1* ), pps_ref_wraparound_enabled_flag shall be 0.

FIG. 22

| |
|---|
| pps_ref_wraparound_enabled_flag equal to 1 specifies that horizontal wrap-around motion compensation is applied in inter prediction. pps_ref_wraparound_enabled_flag equal to 0 specifies that horizontal wrap-around motion compensation is not applied. When sps_ref_wraparound_enabled_flag equals to 0 or the value of ( CtbSizeY / MinCbSizeY + 1 ) is larger than ( pic_width_in_luma_samples / MinCbSizeY − 1 ), pps_ref_wraparound_enabled_flag shall be 0, *otherwise pps_ref_wraparound_enabled_flag shall be equal to 1*. |
| pps_ref_wraparound_offset plus *( CtbSizeY / MinCbSizeY )* + 2 specifies the value of offset used for computing the horizontal wrap-around position in units of MinCbSizeY luma samples. When present, the value of pps_ref_wraparound_offset shall be in the range of *0* to ( pic_width_in_luma_samples / MinCbSizeY ) − *( CtbSizeY / MinCbSizeY )* − 2, inclusive. |

FIG. 23

PicRefWraparoundOffset = pps_ref_wraparound_offset + ( CtbSizeY / MinCbSizeY ) + 2

FIG. 24

| |
|---|
| pic_width_max_in_luma_samples specifies the maximum width, in units of luma samples, of each decoded picture referring to the SPS. pic_width_max_in_luma_samples shall not be equal to 0 and shall be an integer multiple of Max( 8, MinCbSizeY ). |
| pic_height_max_in_luma_samples specifies the maximum height, in units of luma samples, of each decoded picture referring to the SPS. pic_height_max_in_luma_samples shall not be equal to 0 and shall be an integer multiple of Max( 8, MinCbSizeY ). |
| sps_ref_wraparound_enabled_flag equal to 1 specifies that horizontal wrap-around motion compensation is applied in inter prediction. sps_ref_wraparound_enabled_flag equal to 0 specifies that horizontal wrap-around motion compensation is not applied. ~~When the value of ( CtbSizeY / MinCbSizeY + 1 ) is less than or equal to ( pic_width_in_luma_samples / MinCbSizeY − 1 ), where pic_width_in_luma_samples is the value of pic_width_in_luma_samples in any PPS that refers to the SPS, the value of sps_ref_wraparound_enabled_flag shall be equal to 0.~~ |
| sps_ref_wraparound_offset_minus1 plus 1 specifies the offset used for computing the horizontal wrap-around position in units of MinCbSizeY luma samples. *The value of sps_ref_wraparound_offset_minus1 shall be larger than or equal to ( CtbSizeY / MinCbSizeY ) + 1.* ~~The value of sps_ref_wraparound_offset_minus1 shall be in the range of ( CtbSizeY / MinCbSizeY ) + 1 to ( pic_width_in_luma_samples / MinCbSizeY ) − 1, inclusive, where pic_width_in_luma_samples is the value of pic_width_in_luma_samples in any PPS that refers to the SPS.~~ |

FIG. 25

When sps_ref_wraparound_enabled_flag is equal to 1, pic_width_max_in_luma_samples / MinCbSizeY is larger than or equal to ( CtbSizeY / MinCbSizeY + 2) and pic_width_max_in_luma_samples / MinCbSizeY is larger than or equal to (sps_ref_wraparound_offset_minus1+1);

OR:

When sps_ref_wraparound_enabled_flag is equal to 1, pic_width_max_in_luma_samples / MinCbSizeY is larger than or equal to max ( CtbSizeY / MinCbSizeY + 2, sps_ref_wraparound_offset_minus1 + 1).

FIG. 26 pic_width_in_luma_samples specifies the width of each decoded picture referring to the PPS in units of luma samples. pic_width_in_luma_samples shall not be equal to 0, shall be an integer multiple of Max( 8, MinCbSizeY ), and shall be less than or equal to pic_width_max_in_luma_samples. When sps_ref_wraparound_enabled_flag equals to 1, pic_width_in_luma_samples / MinCbSizeY shall be larger than or equal to ( CtbSizeY / MinCbSizeY + 2) and pic_width_in_luma_samples / MinCbSizeY shall be larger than or equal to (sps_ref_wraparound_offset_minus1+1);

OR:

When sps_ref_wraparound_enabled_flag equals to 1, the value of (CtbSizeY / MinCbSizeY + 1) shall be less than or equal to the value of ( pic_width_in_luma_samples / MinCbSizeY − 1).

FIG. 27

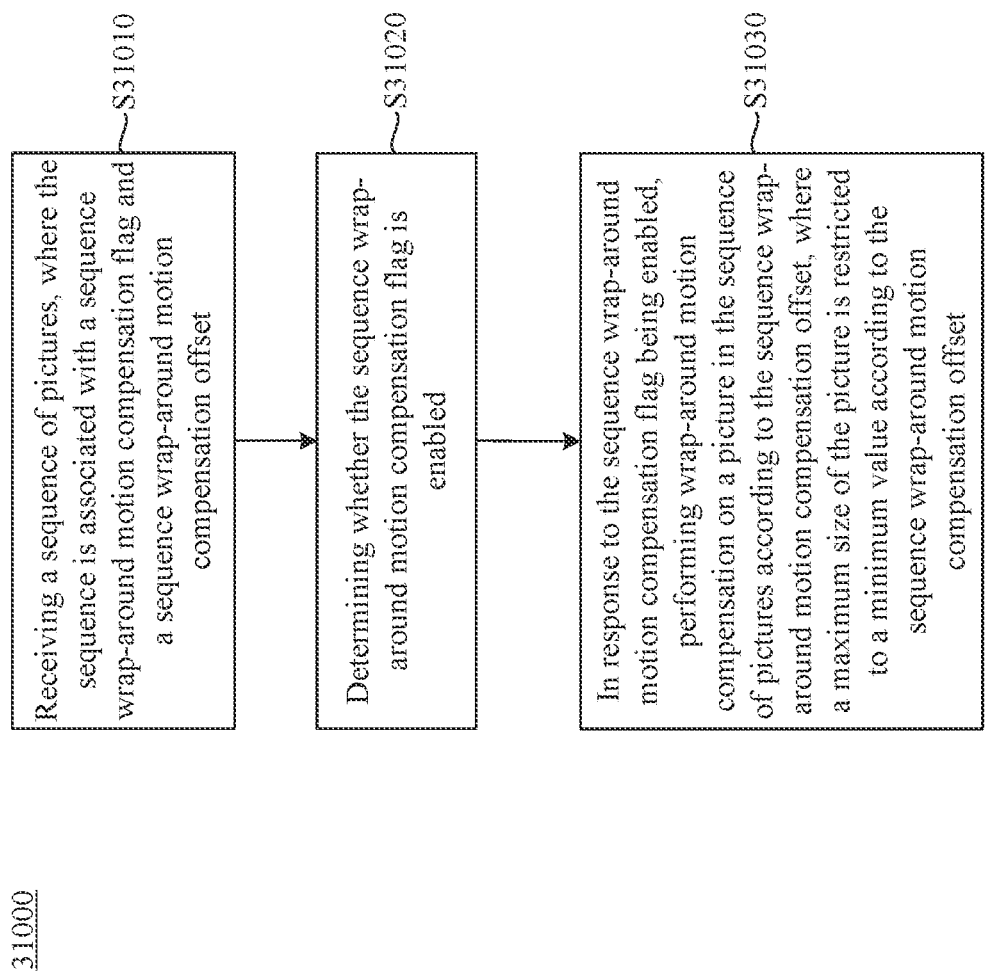

METHODS FOR PERFORMING WRAP-AROUND MOTION COMPENSATION

CROSS-REFERENCE TO RELATED APPLICATIONS

The present disclosure is a continuation of U.S. application Ser. No. 18/067,166, filed Dec. 16, 2022, which is a continuation of U.S. application Ser. No. 17/124,831, filed on Dec. 17, 2020, which claims the benefits of priority to U.S. Provisional Patent Application No. 62/949,396, filed on Dec. 17, 2019, all of which are incorporated herein by reference in their entireties.

TECHNICAL FIELD

The present disclosure generally relates to video processing, and more particularly, to methods and systems for performing wrap-around motion compensation.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (e.g., HEVC/H.265) standard, the Versatile Video Coding (e.g., VVC/H.266) standard, and AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide a method for performing motion compensation performed by a decoder. The method includes receiving a first wrap-around motion compensation flag associated with one or more pictures indicating whether a horizontal wrap-around is enabled or disabled for the one or more picture, and a second wrap-around motion compensation flag associated with a sequence of pictures indicating whether a horizontal wrap-around is enabled or disabled for the sequence of pictures; and determining whether the first wrap-around motion compensation flag is equal to a first value or a second value based on the second wrap-around motion compensation flag or a luma coding tree block size, wherein determining whether the first wrap-around motion compensation flag is equal to the first value or the second value based on the second wrap-around motion compensation flag or the luma coding tree block size further comprises: when the second wrap-around motion compensation flag is equal to the second value, determining the first wrap-around motion compensation flag equal to the second value, or when the luma coding tree block size in unit of minimum coding block plus 1 is greater than a picture width in unit of minimum coding block minus 1, determining the first wrap-around motion compensation flag is equal to the second value; wherein the first wrap-around motion compensation flag being equal to the first value indicates that a horizontal wrap-around motion compensation is enabled and the first wrap-around motion compensation flag being equal to the second value indicates that the horizontal wrap-around motion compensation is disabled, and the second wrap-around motion compensation flag being equal to the first value indicates that the horizontal wrap-around motion compensation is enabled and the second wrap-around motion compensation flag being equal to the second value indicates that the horizontal wrap-around motion compensation is disabled.

Embodiments of the present disclosure further provide a method for performing motion compensation performed by an encoder. The method includes signaling a first wrap-around motion compensation flag associated with one or more pictures indicating whether a horizontal wrap-around is enabled or disabled for the one or more picture, and a second wrap-around motion compensation flag associated with a sequence of pictures indicating whether a horizontal wrap-around is enabled or disabled for the sequence of pictures; and determining whether the first wrap-around motion compensation flag is equal to a first value or a second value based on the second wrap-around motion compensation flag or a luma coding tree block size, wherein determining whether the first wrap-around motion compensation flag is equal to the first value or the second value based on the second wrap-around motion compensation flag or the luma coding tree block size further comprises: when the second wrap-around motion compensation flag is equal to the second value, determining the first wrap-around motion compensation flag equal to the second value, or when the luma coding tree block size in unit of minimum coding block plus 1 is greater than a picture width in unit of minimum coding block minus 1, determining the first wrap-around motion compensation flag is equal to the second value; wherein the first wrap-around motion compensation flag equal to the first value indicates a horizontal wrap-around motion compensation is enabled and the first wrap-around motion compensation flag equal to the second value indicates the horizontal wrap-around motion compensation is disabled, and the second wrap-around motion compensation flag equal to the first value indicates the horizontal wrap-around motion compensation is enabled and the second wrap-around motion compensation flag equal to the second value indicates the horizontal wrap-around motion compensation is disabled.

Embodiments of the present disclosure further provide a non-transitory computer readable storage medium for storing a bitstream generated by an encoder. The encoder is configured to perform signaling a first wrap-around motion compensation flag associated with one or more pictures indicating whether a horizontal wrap-around is enabled or disabled for the one or more picture, and a second wrap-around motion compensation flag associated with a sequence of pictures indicating whether a horizontal wrap-around is enabled or disabled for the sequence of pictures; and determining whether the first wrap-around motion compensation flag is equal to a first value or a second value based on the second wrap-around motion compensation flag or a luma coding tree block size, wherein determining whether the first wrap-around motion compensation flag is equal to the first value or the second value based on the second wrap-around motion compensation flag or the luma coding tree block size further comprises: when the second wrap-around motion compensation flag is equal to the second value, determining the first wrap-around motion compensation flag equal to the second value, or when the luma coding tree block size in unit of minimum coding block plus 1 is greater than a picture width in unit of minimum coding block minus 1, determining the first wrap-around motion compensation flag is equal to the second value; wherein the first wrap-around motion compensation flag equal to the first value indicates a horizontal wrap-around motion compensation is enabled and the first wrap-around motion compensation flag equal to the second value indicates the horizontal wrap-around motion compensation is disabled, and the second wrap-around motion compensation flag equal to the first value indicates the horizontal wrap-around motion compensation is enabled and the second wrap-around motion compensation flag equal to the second value indicates the horizontal wrap-around motion compensation is disabled.

BRIEF DESCRIPTION OF THE DRAWINGS

Embodiments and various aspects of the present disclosure are illustrated in the following detailed description and the accompanying figures. Various features shown in the figures are not drawn to scale.

FIG. 7 shows syntax of an example sequence parameter set for wrap-around motion compensations, according to some embodiments of the present disclosure.

FIG. 8 shows semantics of an example sequence parameter set for wrap-around motion compensations, according to some embodiments of the present disclosure.

FIG. 9 shows syntax of an example sequence parameter set for improved wrap-around motion compensations, according to some embodiments of the present disclosure.

FIG. 10 shows semantics of an example sequence parameter set for improved wrap-around motion compensations, according to some embodiments of the present disclosure.

FIG. 11 shows semantics of an example sequence parameter set for improved wrap-around motion compensations with a maximum picture width, according to some embodiments of the present disclosure.

FIG. 12 shows example derivations of variables "PicRefWraparoundEnableFlag" and "PicRefWraparoundOffset," according to some embodiments of the present disclosure.

FIG. 13 shows example derivations of a sample position used for motion compensation, according to some embodiments of the present disclosure.

FIG. 14 shows syntax of an example sequence parameter set and picture parameter set for wrap-around motion compensations with a wrap-around motion compensation offset in the picture parameter set, according to some embodiments of the present disclosure.

FIG. 15 shows semantics of an example sequence parameter set and picture parameter set for wrap-around motion compensation with a wrap-around motion compensation offset in the picture parameter set, according to some embodiments of the present disclosure.

FIG. 16 shows syntax of an example sequence parameter set for improved wrap-around motion compensations without a wrap-around motion compensation offset, according to some embodiments of the present disclosure.

FIG. 17 shows syntax of an example picture parameter set for improved wrap-around motion compensations with a wrap-around motion compensation offset, according to some embodiments of the present disclosure.

FIG. 18 shows semantics of an example sequence parameter set and picture parameter set for improved wrap-around motion compensations with a wrap-around motion compensation offset in the picture parameter set, according to some embodiments of the present disclosure.

FIG. 19 shows example derivations of variables "PicRefWraparoundEnableFlag" and "PicRefWraparoundOffset," according to some embodiments of the present disclosure.

FIG. 20 shows syntax of an example sequence parameter set for improved wrap-around motion compensations without a wrap-around motion compensation offset in the sequence parameter set, according to some embodiments of the present disclosure.

FIG. 21 shows syntax of an example picture parameter set for improved wrap-around motion compensations with a wrap-around controlling flag, according to some embodiments of the present disclosure.

FIG. 22 shows semantics of an example sequence parameter set and picture parameter set for improved wrap-around motion compensations with a wrap-around controlling flag in the picture parameter set, according to some embodiments of the present disclosure.

FIG. 23 shows semantics of an example sequence parameter set and picture parameter set for improved wrap-around motion compensations with a wrap-around controlling flag in the picture parameter set, according to some embodiments of the present disclosure.

FIG. 24 shows an example derivation of variable "PicRefWraparoundOffset," according to some embodiments of the present disclosure.

FIG. 25 shows semantics of an example sequence parameter set and picture parameter set for improved wrap-around motion compensations with a restriction on a picture size, according to some embodiments of the present disclosure.

FIG. 26 shows semantics of an example sequence parameter set for improved wrap-around motion compensations with restrictions imposed on variables "pic_width_max_in_luma_samples," "CtbSizeY," and "MinCbSizeY," according to some embodiments of the present disclosure.

FIG. 27 shows semantics of an example picture parameter set for improved wrap-around motion compensations with restrictions imposed on variable "pic_width_in_luma_samples," according to some embodiments of the present disclosure.

FIG. 31 shows a flowchart of an example method for performing motion compensations with a restricted maximum picture size, according to some embodiments of the present disclosure.

DETAILED DESCRIPTION

Figure 1:
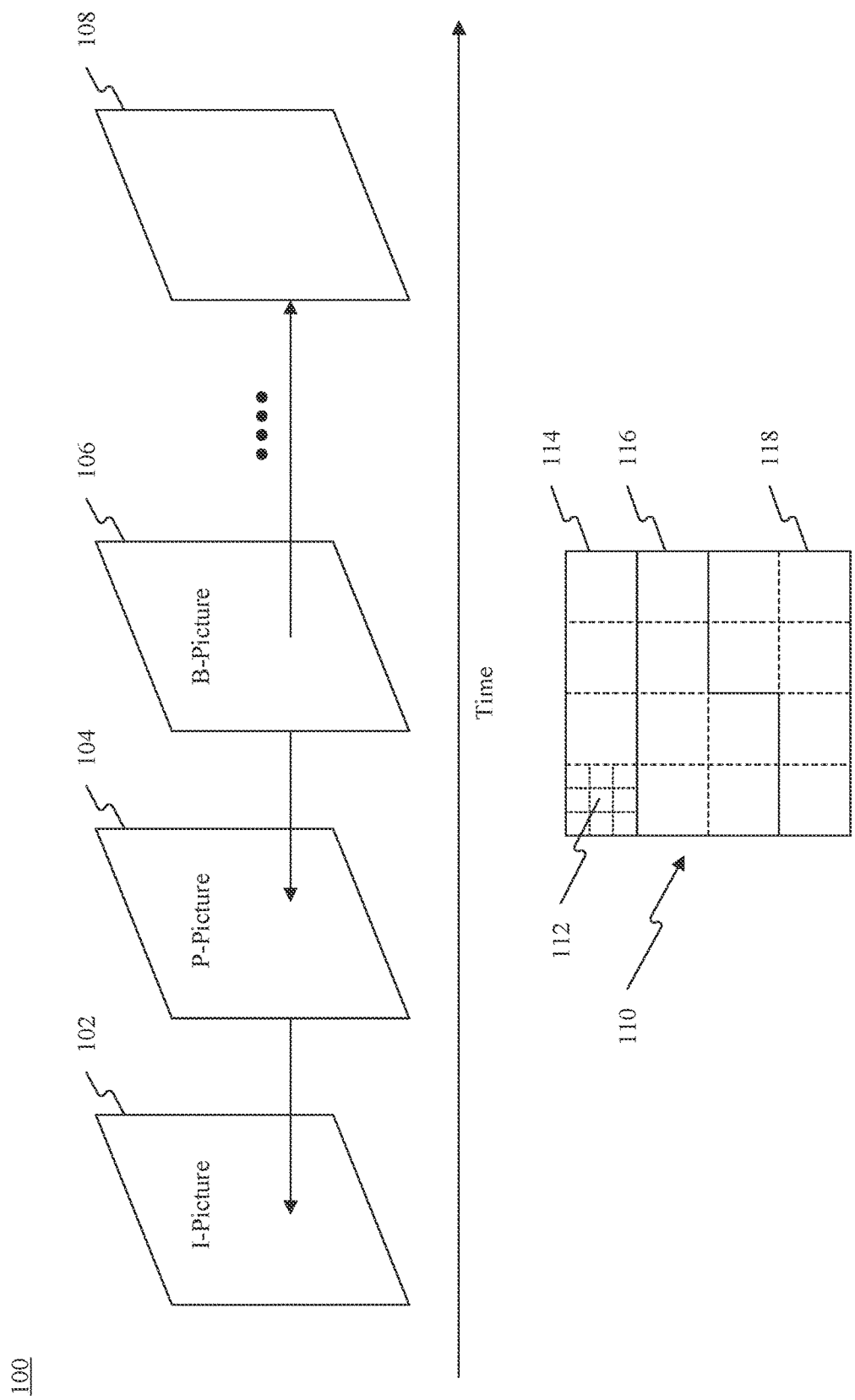
FIG. 1 shows structures of an example video sequence, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims. Particular aspects of the present disclosure are described in greater detail below. The terms and definitions provided herein control, if in conflict with terms and/or definitions incorporated by reference.

The Joint Video Experts Team (JVET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

In order to achieve the same subjective quality as HEVC/H.265 using half the bandwidth, the Joint Video Experts Team ("JVET") has been developing technologies beyond HEVC using the joint exploration model ("JEM") reference software. As coding technologies were incorporated into the JEM, the JEM achieved substantially higher coding performance than HEVC. The VCEG and MPEG have also formally started the development of a next generation video compression standard beyond HEVC.

The VVC standard has been developed recently and continues to include more coding technologies that provide better compression performance. VVC is based on the same hybrid video coding system that has been used in modern video compression standards such as HEVC, H.264/AVC, MPEG2, H.263, etc.

A video is a set of static pictures (or frames) arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

To reduce the storage space and the transmission bandwidth needed by such applications, the video can be compressed. For example, the video can be compressed before storage and transmission and decompressed before the display. The compression and decompression can be implemented by software executed by a processor (e.g., a processor of a generic computer) or specialized hardware. The module or circuitry for compression is generally referred to as an "encoder," and the module or circuitry for decompression is generally referred to as a "decoder." The encoder and the decoder can be collectively referred to as a "codec." The encoder and the decoder can be implemented as any of a variety of suitable hardware, software, or a combination thereof. For example, the hardware implementation of the encoder and the decoder can include circuitry, such as one or more microprocessors, digital signal processors ("DSPs"), application-specific integrated circuits ("ASICs"), field-programmable gate arrays ("FPGAs"), discrete logic, or any combinations thereof. The software implementation of the encoder and the decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture. If information that was disregarded in the video encoding process cannot be fully reconstructed, the encoding process can be referred to as "lossy." Otherwise, it can be referred to as "lossless." Most encoding processes are lossy, which is a tradeoff to reduce the needed storage space and the transmission bandwidth.

In many cases, the useful information of a picture being encoded (referred to as a "current picture") can include changes with respect to a reference picture (e.g., a picture previously encoded or reconstructed). Such changes can include position changes, luminosity changes, or color changes of the pixels. Position changes of a group of pixels that represent an object can reflect the motion of the object between the reference picture and the current picture.

A picture coded without referencing another picture (i.e., it is its own reference picture) is referred to as an "I-picture." A picture coded using a previous picture as a reference picture is referred to as a "P-picture." A picture coded using both a previous picture and a future picture as reference pictures (i.e., the reference is "bi-directional") is referred to as a "B-picture."

FIG. 1 shows structures of an example video sequence, according to some embodiments of the present disclosure. As shown in FIG. 1, video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2A:
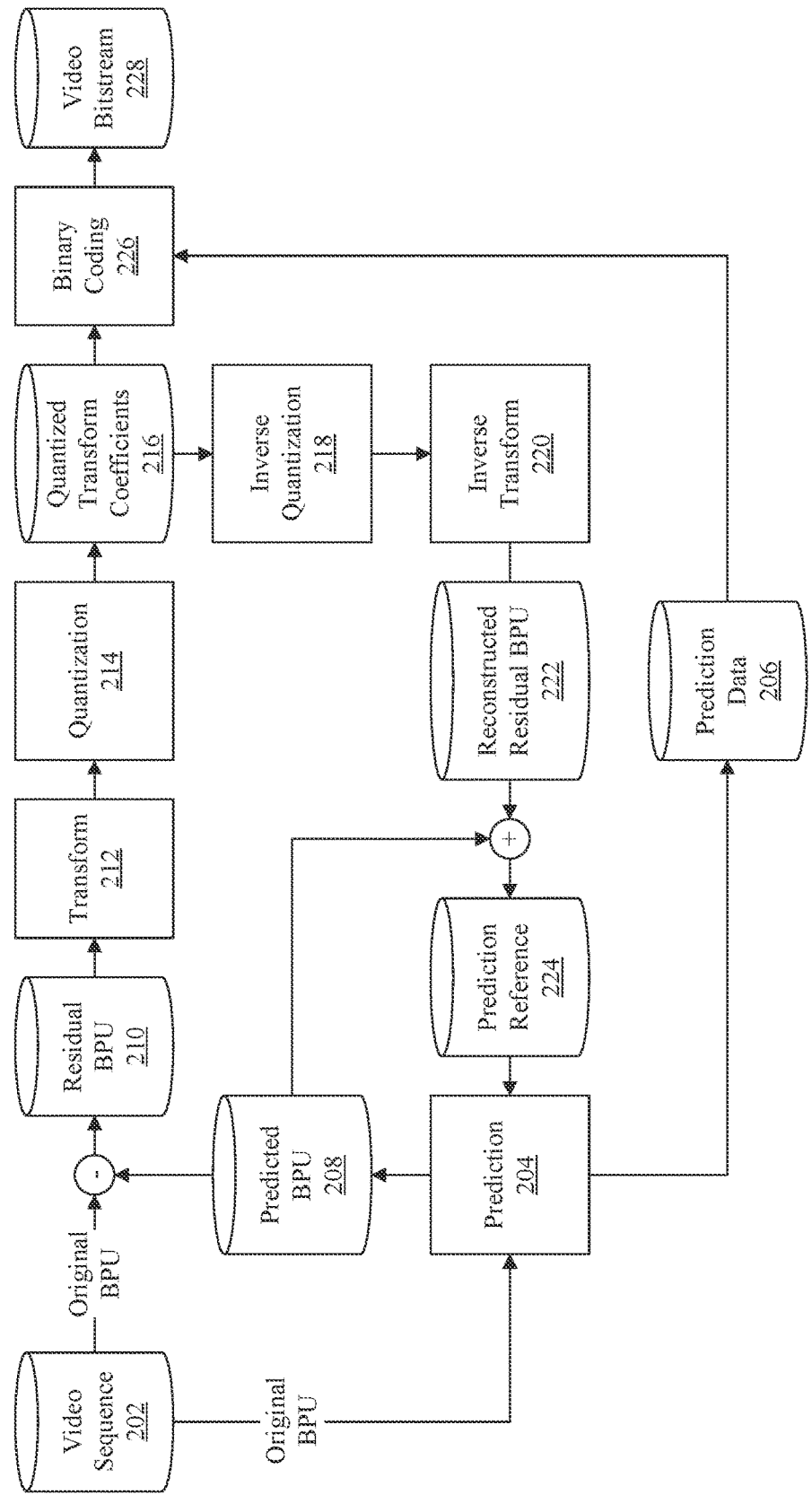
FIG. 2A shows a schematic diagram of an example encoding process, according to some embodiments of the present disclosure.
Figure 2B:
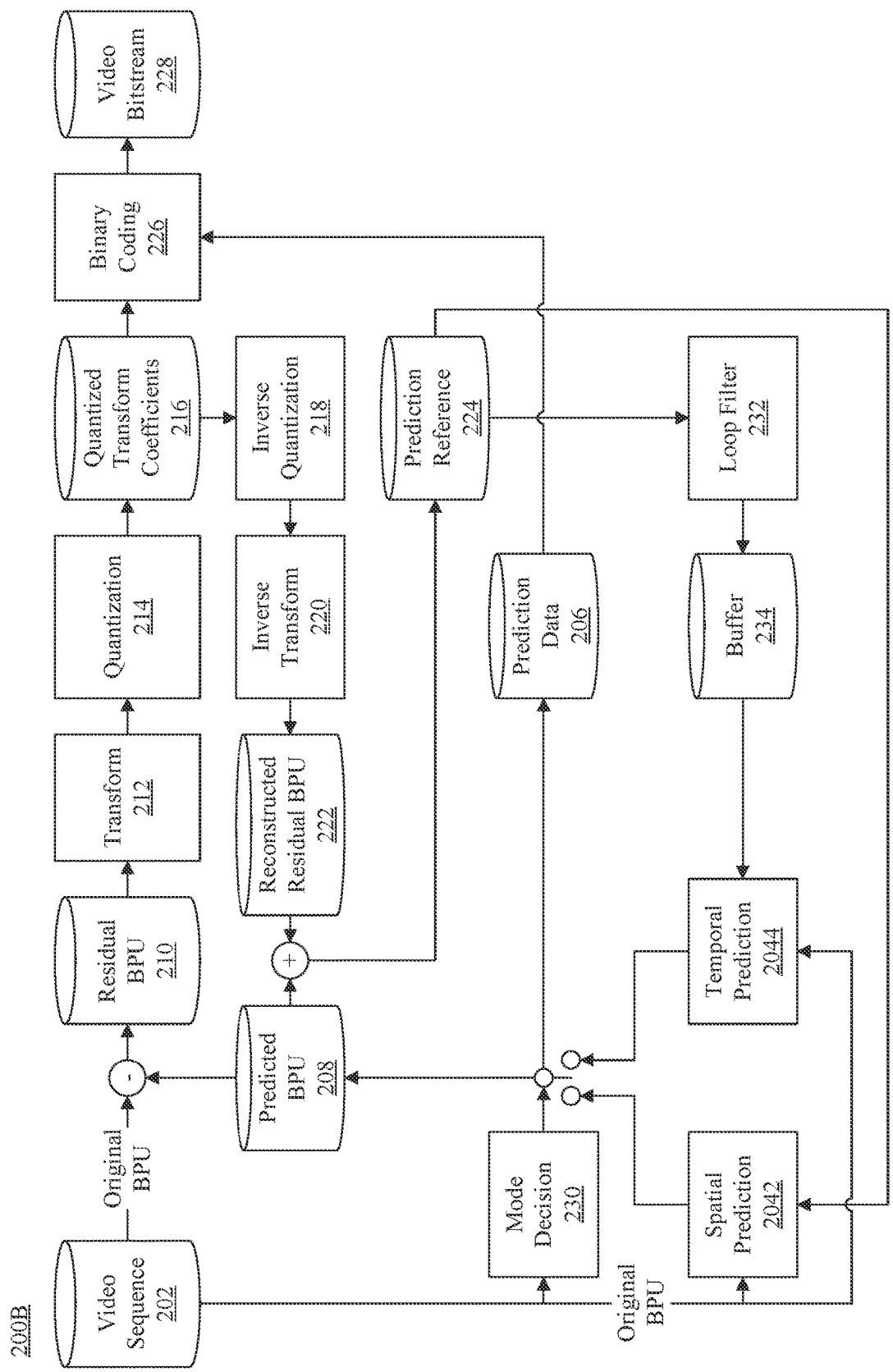
FIG. 2B shows a schematic diagram of another example encoding process, according to some embodiments of the present disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A shows a schematic diagram of an example encoding process, according to some embodiments of the present disclosure. For example, encoding process 200A shown in FIG. 2A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B shows a schematic diagram of another example encoding process, according to some embodiments of the present disclosure. As shown in FIG. 2B, process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (i.e., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (i.e., pictures 104 and 108) are at both temporal directions with respect to picture 104.

Still referring to the forward path of process 200B, after spatial prediction stage 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
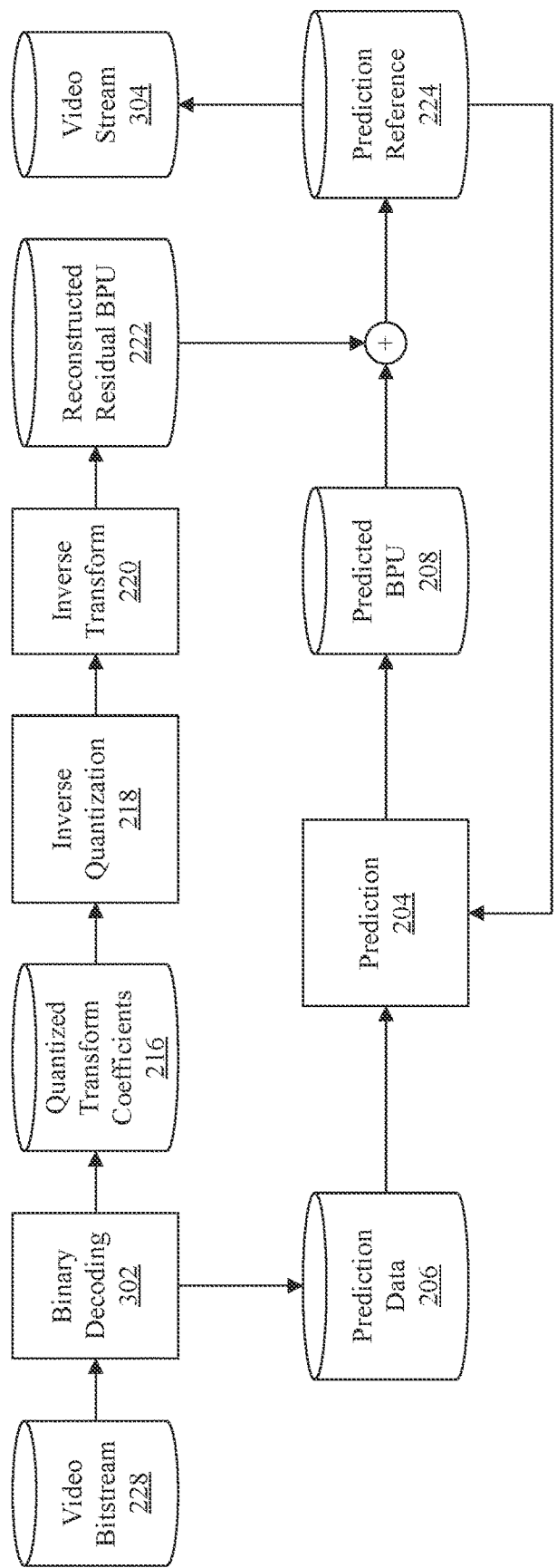
FIG. 3A shows a schematic diagram of an example decoding process, according to some embodiments of the present disclosure.

FIG. 3A shows a schematic diagram of an example decoding process, according to some embodiments of the present disclosure. As shown in FIG. 3A, process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
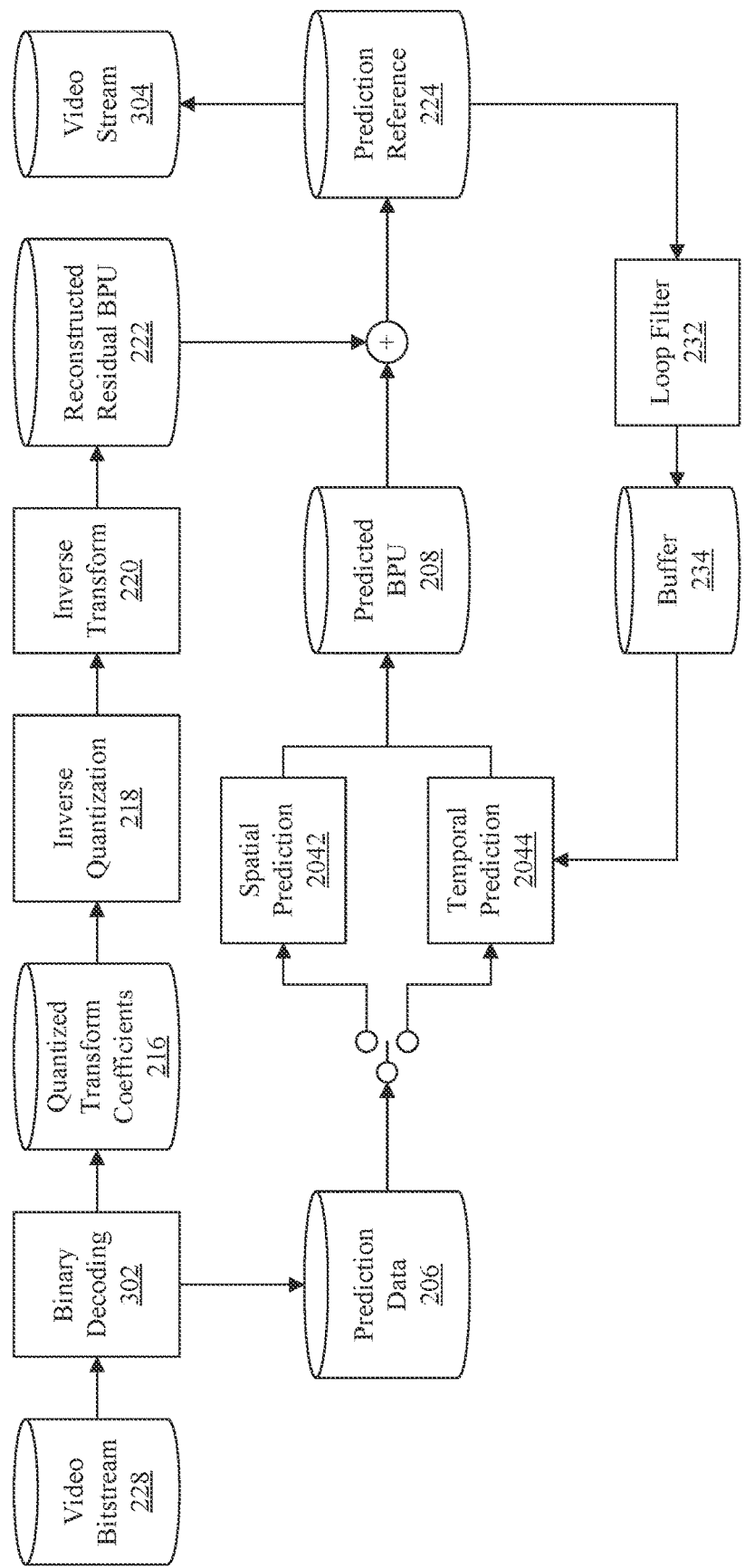
FIG. 3B shows a schematic diagram of another example decoding process, according to some embodiments of the present disclosure.

FIG. 3B shows a schematic diagram of another example decoding process, according to some embodiments of the present disclosure. As shown in FIG. 3B, process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength).

Figure 4:
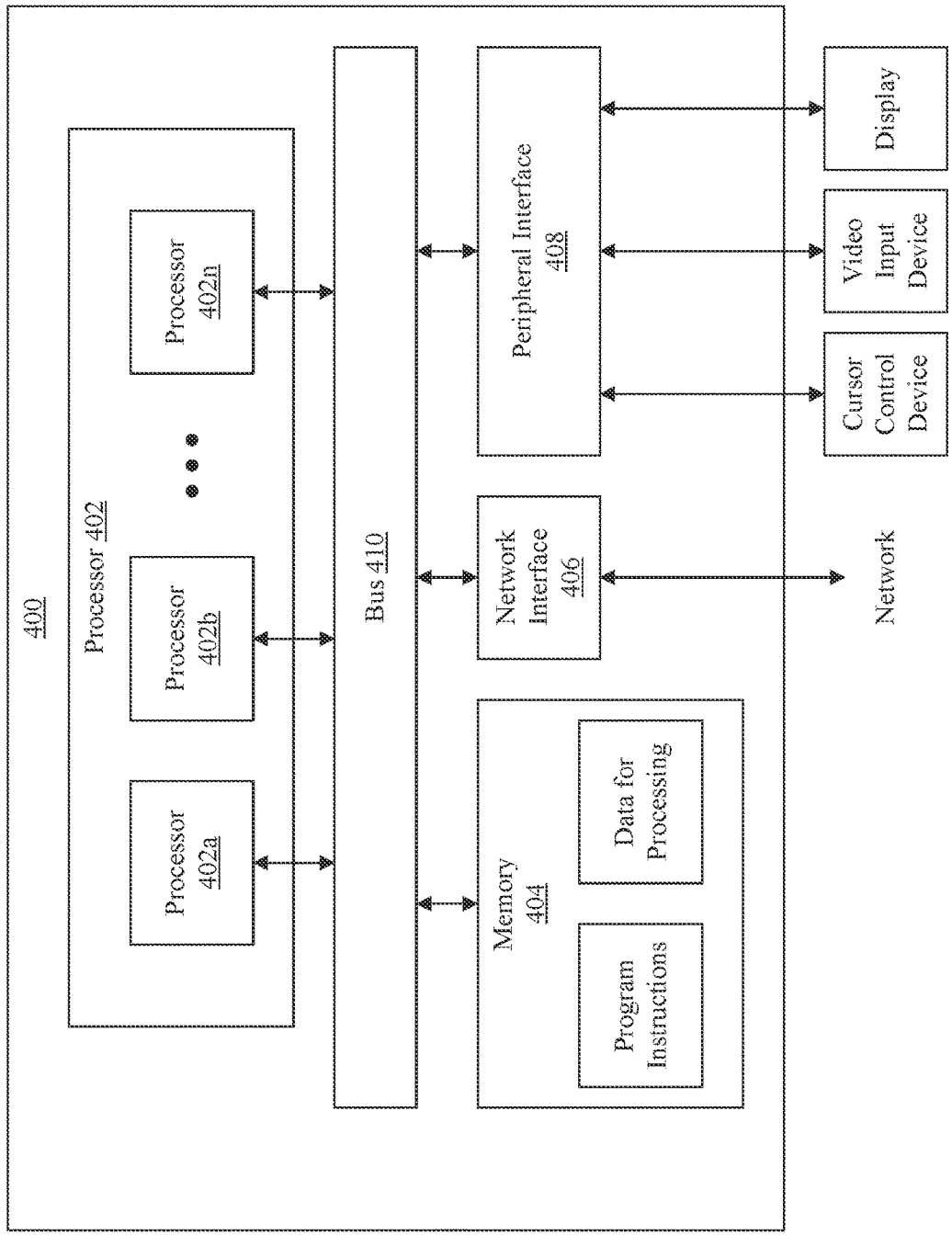
FIG. 4 shows a block diagram of an example apparatus for encoding or decoding a video, according to some embodiments of the present disclosure.

FIG. 4 shows a block diagram of an example apparatus for encoding or decoding a video, according to some embodiments of the present disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface communicatively coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

In the quantization and inverse quantization functional blocks (e.g., quantization 214 and inverse quantization 218 of FIG. 2A or FIG. 2B, inverse quantization 218 of FIG. 3A or FIG. 3B), a quantization parameter (QP) is used to determine the amount of quantization (and inverse quantization) applied to the prediction residuals. Initial QP values used for coding of a picture or slice can be signaled at the high level, for example, using init_qp_minus26 syntax element in the Picture Parameter Set (PPS) and using slice_qp_delta syntax element in the slice header. Further, the QP values can be adapted at the local level for each CU using delta QP values sent at the granularity of quantization groups.

An Equirectangular projection ("ERP") format is a common projection format used to represent 360-degree videos and images. The projection maps meridians to vertical straight lines of constant spacing, and circles of latitude to horizontal straight lines of constant spacing. Because the particularly simple relationship between the position of an image pixel on the map and its corresponding geographic location on sphere, ERP is one of the most common projections used for 360-degree videos and images.

Algorithm description of projection format conversion and video quality metrics output by JVET gives the introduction and coordinate conversion between ERP and sphere. For 2D-to-3D coordinate conversion, given a sampling position (m, n), (u, v) can be calculated based on the following equations (1) and (2).

$$u = (m + 0.5)/W, 0 \le m < W \quad \text{Eq. (1)}$$

$$v = (n + 0.5)/H, 0 \le n < H \quad \text{Eq. (2)}$$

Then, the longitude and latitude ($\phi$, $\theta$) in the sphere can be calculated from (u, v) based on the following equations (3) and (4).

$$\phi = (u - 0.5) \times (2 \times \pi) \quad \text{Eq. (3)}$$

$$\theta = (0.5 - v) \times \pi \quad \text{Eq. (4)}$$

Coordinates (X, Y, Z) can be calculated based on the following equations (5)-(7).

$$X = \cos(\theta)\cos(\phi) \quad \text{Eq. (5)}$$

$$Y = \sin(\theta) \quad \text{Eq. (6)}$$

$$Z = -\cos(\theta)\sin(\phi) \quad \text{Eq. (7)}$$

For 3D-to-2D coordinate conversion starting from (X, Y, Z), ($\phi$, $\theta$) can be calculated based on the following equations (8) and (9). Then, (u, v) is calculated based on equations (3) and (4). Finally, (m, n) can be calculated based on equations (1) and (2).

$$\phi = \tan^{-1}(-Z/X) \quad \text{Eq. (8)}$$

$$\theta = \sin^{-1}\left(Y/(X^2 + Y^2 + Z^2)^{1/2}\right) \quad \text{Eq. (9)}$$

To reduce the seam artifacts in reconstructed viewports that encompass the left and right boundaries of the ERP picture, a new format called padded equirectangular projection ("PERP") is provided by padding samples on each of the left and the right sides of the ERP picture.

When PERP is used to represent the 360-degree videos, the PERP picture is encoded. After decoding, the reconstructed PERP is converted back to reconstructed ERP by blending the duplicated samples or cropping the padded areas.

Figure 5A:
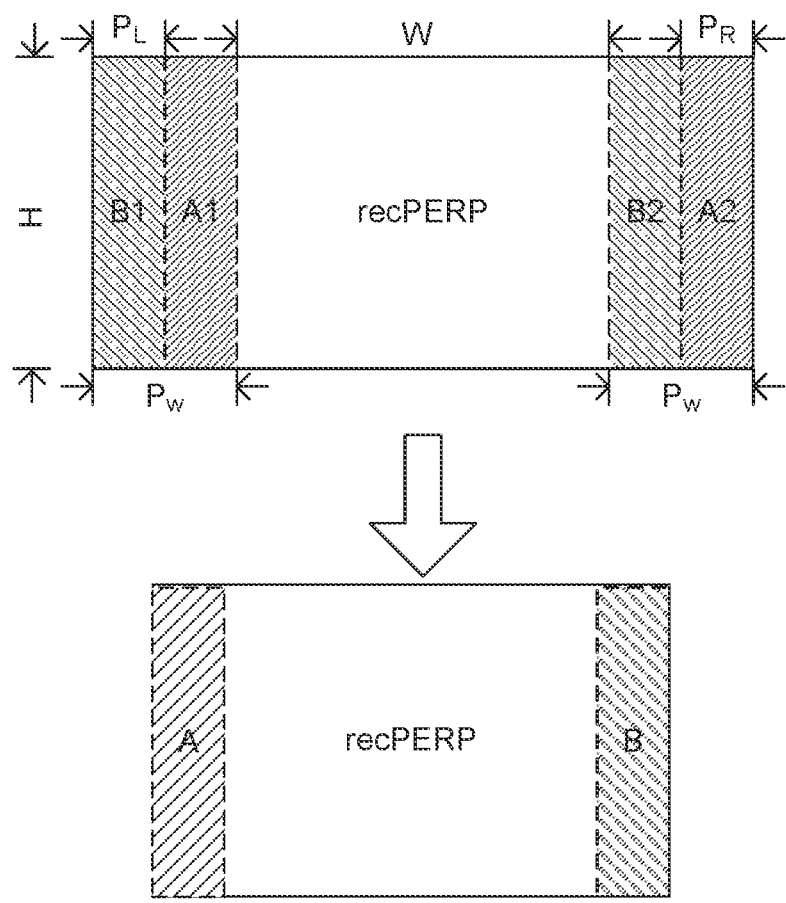
FIG. 5A shows a schematic of an example blending operation for generating reconstructed equirectangular projections, according to some embodiments of the present disclosure.

FIG. 5A shows a schematic of an example blending operation for generating reconstructed equirectangular projections, according to some embodiments of the present disclosure. Unless otherwise stated, "recPERP" is used to denote the reconstructed PERP before the post-processing, and "recERP" is used to denote the reconstructed ERP after the post-processing. As shown in FIG. 5A, the duplicated samples of the recPERP can be blended by applying a distance-based weighted averaging operation. For example, region A can be generated by blending regions A1 with A2, and region B is generated by blending regions B1 with B2.

In the following description, the width and height of unpadded recERP are denoted as "W" and "H" respectively. The left and right padding widths are denoted as "PL" and "PR" respectively. The total padding width is denoted as "Pw," which can be a sum of PL and PR. In some embodiments, recPERP can be converted to recERP via blending operations. For example, for a sample recERP(j, i) in A where i=[0, $P_{R-1}$] and j=[0, H−1], recERP (j, i) can be determined according to the following equations.

$$A = w \times A1 + (1-w) \times A2, \text{ where } w \text{ is from } P_L/P_W \text{ to } 1 \quad \text{Eq. (10)}$$

$$\text{recERP } (j, i) \text{ in } A = (\text{recPERP } (j, i+P_L) \times (i+P_L) + \quad \text{Eq. (11)}$$
$$\text{recPERP } (j, i+P_{L+w}) \times (P_{R-i}) + (Pw \gg 1))/Pw$$

In some embodiments, for a sample recERP(j, i) in B where i=[W−$P_L$, W−1] and j=[0, H−1], recERP (j, i) can be generated according to the following equations.

$$B = k \times B1 + (1-k) \times B2, \text{ where } k \text{ is from } 0 \text{ to } P_L/P_W \quad \text{Eq. (12)}$$

$$\text{recERP } (j, i) \text{ in } B = (\text{recPERP } (j, i+P_L) \times (P_{R-i} + W) + \quad \text{Eq. (13)}$$
$$\text{recPERP } (j, i+P_{L-w}) \times (i - W + P_L) + (Pw \gg 1))/Pw$$

Figure 5B:
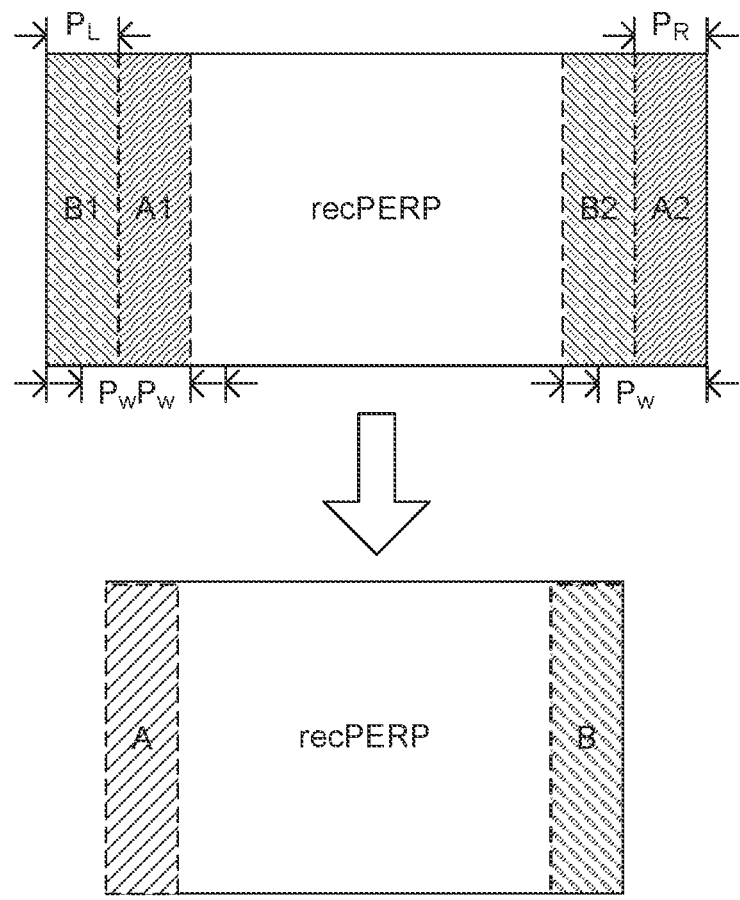
FIG. 5B shows schematic of an example cropping operation for generating reconstructed equirectangular projections, according to some embodiments of the present disclosure.

FIG. 5B shows schematic of an example cropping operation for generating reconstructed equirectangular projections, according to some embodiments of the present disclosure. As shown in FIG. 5B, during the cropping process, the padded samples in recPERP can be directly discarded to obtain recERP. For example, padded samples B1 and A2 can be discarded, and the padded area A is equal to A1 while the padded area B is equal to B2.

In some embodiments, horizontal wrap-around motion compensation can be used to improve the coding performance of ERP. For example, the horizontal wrap-around motion compensation can be used in the VVC standard as a 360-specific coding tool designed to improve the visual quality of reconstructed 360-degree video in the ERP format or PERP format. In a conventional motion compensation, when a motion vector refers to samples beyond the picture boundaries of the reference picture, repetitive padding is applied to derive the values of the out-of-bounds samples by copying from those nearest neighbors on the corresponding picture boundary. For 360-degree video, this method of repetitive padding is not suitable, and could cause visual artefacts called "seam artefacts" in a reconstructed viewport video. Because a 360-degree video is captured on a sphere and inherently has no "boundary," the reference samples that are out of the boundaries of a reference picture in the projected domain can be obtained from neighboring samples in the spherical domain. For a general projection format, it may be difficult to derive the corresponding neighboring samples in the spherical domain, because it involves 2D-to-3D and 3D-to-2D coordinate conversion, as well as sample interpolation for fractional sample positions. This problem can be resolved for the left and right boundaries of the ERP or PERP projection format, as the spherical neighbors outside of the left picture boundary can be obtained from samples inside the right picture boundary, and vice versa. Given the wide usage of the ERP or PERP projection format, and the relative ease of implementation, the horizontal wrap-around motion compensation was adopted to VVC to improve the visual quality of 360-degree video coded in the ERP or PERP projection format.

Figure 6A:
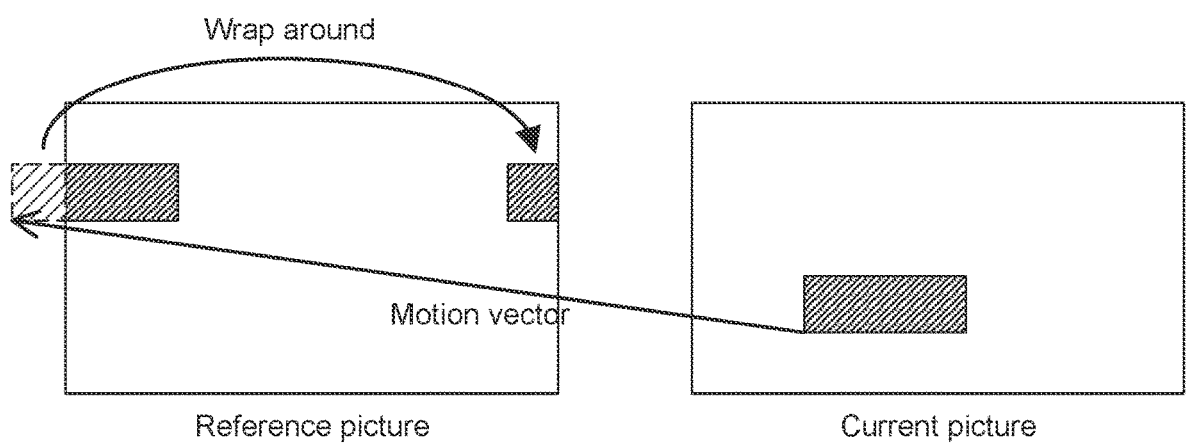
FIG. 6A shows a schematic of an example horizontal wrap-around motion compensation process for equirectangular projections, according to some embodiments of the present disclosure.

FIG. 6A shows a schematic of an example horizontal wrap-around motion compensation process for equirectangular projections, according to some embodiments of the present disclosure. As shown in FIG. 6A, when a part of the reference block is outside of the reference picture's left (or right) boundary in the projected domain, instead of repetitive padding, the "out-of-boundary" part can be taken from the corresponding spherical neighbors that are located within the reference picture toward the right (or left) boundary in the projected domain. In some embodiments, repetitive padding is only used for the top and bottom picture boundaries.

Figure 6B:
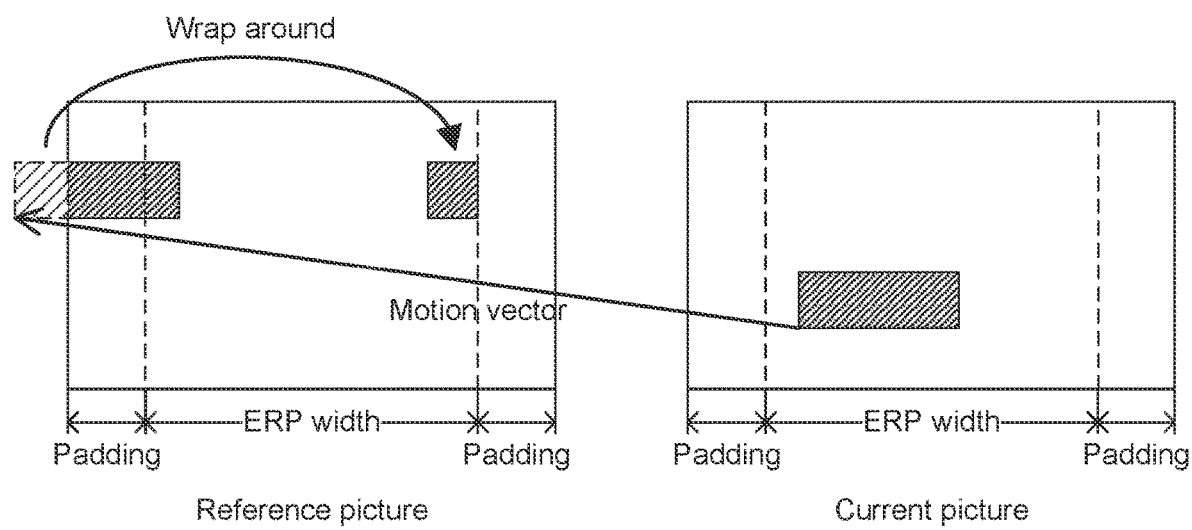
FIG. 6B shows a schematic of an example horizontal wrap-around motion compensation process for padded equirectangular projections, according to some embodiments of the present disclosure.

FIG. 6B shows a schematic of an example horizontal wrap-around motion compensation process for padded equirectangular projections, according to some embodiments of the present disclosure. As shown in FIG. 6B, the horizontal wrap-around motion compensation can be combined with a non-normative padding method that is often used in 360-degree video coding. In some embodiments, this is achieved by signaling a high level syntax element to indicate the wrap-around motion compensation offset, which can be set to the ERP picture width before padding. This syntax can be used to adjust the position of horizontal wrap-around accordingly. In some embodiments, this syntax is not affected by a specific amount of padding on the left or right picture boundaries. As a result, this syntax can naturally support asymmetric padding of the ERP picture. In the asymmetric padding of the ERP picture, the left and right paddings are different. In some embodiments, the wrap-around motion compensation can be determined according to the following equation:

$$pos_x\_\text{wrap} = \begin{cases} pos_x + \text{offset}; & pos_x < 0 \\ pos_x - \text{offset}; & pos_x > picW - 1 \\ pos_x; & \text{otherwise} \end{cases} \quad \text{Eq. (14)}$$

where the offset can be a wrap-around motion compensation offset signaled in the bitstream, picW can be a picture width including the padding area before encoding, $pos_x$ can be a reference position determined by current block position and the motion vector, and the output of the equation $pos_x\_$wrap can be an actual reference position where the reference block is from in the wraparound motion compensation. To save the signaling overhead of the wrap-around motion compensation offset, it can be in unit of minimum luma coding block, thus the offset can be replaced with offset$_w$×MinCbSizeY where offset$_w$ is the wrap-around motion compensation offset in unit of minimum luma coding block which is signaled in the bitstream and MinCbSizeY is the size of minimum luma coding block. In contrast, in a traditional motion compensation, the actual reference position where the reference block is from may be directly derived by clipping $pos_x$ within 0 to picW−1

The horizontal wrap-around motion compensation can provide more meaningful information for motion compensation when the reference samples are outside of the reference picture's left and right boundaries. Under the 360-degree video common test conditions, this tool can improve compression performance not only in terms of rate-distortion, but also in terms of reduced seam artefacts and subjective quality of the reconstructed 360-degree video. The horizontal wrap-around motion compensation can also be used for other single face projection formats with constant sampling density in the horizontal direction, such as adjusted equal-area projection.

In some embodiments, a restriction on the wrap-around motion compensation offset is imposed. The value of the offset can be derived from a range of (CtbSizeY/MinCbSizeY+2) to (pic_width_in_luma_samples/MinCbSizeY). Here, variable "CtbSizeY" refers to a luma size of a coding tree block ("CTB"), variable "MinCbSizeY" refers to a min size of a luma coding block, and variable "pic_width_in_luma_samples" refers to a picture width in luma samples, to avoid repeated wrapping around which is unnecessary in practical application but introduces a burden for hardware implementation.

FIG. 7 shows syntax of an example sequence parameter set for wrap-around motion compensations, according to some embodiments of the present disclosure. As shown in FIG. 5, in VVC (e.g., VVC draft 7), for wrap-around motion compensation, an enabling flag "sps_ref_wraparound_enabled_flag" and an offset "sps_ref_wraparound_offset_minus1" can be signaled in sequence parameter set ("PPS").

FIG. 8 shows semantics of an example sequence parameter set for wrap-around motion compensations, according to some embodiments of the present disclosure. It is appreciated that the semantics shown in FIG. 8 can correspond to the syntax shown in FIG. 7. As shown in FIG. 8, In some embodiments, "sps_ref_wraparound_enabled_flag" can indicate whether the horizontal wrap-around motion compensation is applied in inter prediction. For example, a value of 1 can indicate that the horizontal wrap-around motion compensation is applied, and a value of 0 can indicate that the horizontal wrap-around motion compastion is not applied. In some embodiments, when the value of (CtbSizeY/MinCbSizeY+1) is larger than (pic_width_in_luma_samples/MinCbSizeY−1), the value of sps_ref_wraparound_enabled_flag is equal to 0, where "pic_width_in_luma_samples" is the value of "pic_width_in_luma_samples in any PPS that refers to the SPS.

In some embodiments, as shown in FIG. 8, "sps_ref_wraparound_offset_minus1" plus 1 can indicate the offset used for computing the horizontal wrap-around position in units of "MinCbSizeY" luma samples. In some embodiments, the value of ref_wraparound_offset_minus1 is in a range of (CtbSizeY/MinCbSizeY)+1 to (pic_width_in_luma_samples/MinCbSizeY)−1, inclusive, where pic_width_in_luma_samples is the value of pic_width_in_luma_samples in any PPS that refers to the SPS.

There are a number of issues with the syntax shown in FIG. 7 and the semantics shown in FIG. 8. In particular, "sps_ref_wraparound_enabled_flag" and "sps_ref_wraparound_offset_minus1" are syntax elements signaled in SPS, but there is a conformance constraint dependent on all of the "pic_width_in_luma_samples" which is signaled on PPS. Restricting the value of an SPS syntax element value by the syntax elements in all of the associated PPS can be problematic, since SPS is a higher level syntax than PPS and normally a higher level syntax should not refer to a lower level syntax. Moreover, in some embodiments, the wrap-around motion compensation is controlled at a sequence level, but the change of the picture size is allowed in VVC draft (e.g., VVC draft 7). At the same time, "sps_ref_wraparound_enabled_flag" can only be true when the widths of all the pictures in the sequence referring to the SPS satisfy the constraint condition. Therefore, the wrap-around motion compensation cannot be used even if only one frame fails to meet the size condition, which means the benefit of wrap-around motion compensation for the whole sequence can be lost due to one frame.

In addition, in some embodiments, the range of "sps_ref_wraparound_offset_minus1" is from (CtbSizeY/MinCbSizeY)+1 to (pic_width_in_luma_samples/MinCbSizeY)−1. Therefore, the smallest value signaled in the bitstream for sps_ref_wraparound_offset_minus1 is (CtbSizeY/MinCbSizeY)+1, which may not be a zero value. Generally, larger values take more bits in signaling than smaller values. As a result, it is not efficient to signal a syntax element with a value range not starting from zero.

Embodiments of the present disclosure provide improved methods to solve the issues discussed above. FIG. 9 shows syntax of an example sequence parameter set for improved wrap-around motion compensations, according to some embodiments of the present disclosure. In some embodiments, signaling overhead of the wrap-around motion compensation ("MC") offset can be saved. To save the bits dedicated on the wrap-around motion compensation offset, (CtbSizeY/MinCbSizeY)+2 can be subtracted from wrap-around motion compensation offset before wrap-around motion compensation offset is signaled. As a result, the smallest value of this syntax element can be 0.

FIG. 10 shows semantics of an example sequence parameter set for improved wrap-around motion compensations, according to some embodiments of the present disclosure. As shown in FIG. 10, changes from the previous VVC are shown in italic. It is appreciated that the semantics shown in FIG. 10 can correspond to the syntax shown in FIG. 9.

In some embodiments, as shown in FIG. 10, "sps_ref_wraparound_enabled_flag" can indicate whether the horizontal wrap-around motion compensation is applied in inter prediction. For example, a value of 1 can indicate that the horizontal wrap-around motion compensation is applied, and a value of 0 can indicate that the horizontal wrap-around motion compastion is not applied. In some embodiments, when the value of (CtbSizeY/MinCbSizeY+1) is larger than (pic_width_in_luma_samples/MinCbSizeY−1), the value of "sps_ref_wraparound_enabled_flag" is equal to 0.

In some embodiments, as shown in FIG. 10, "sps_ref_wraparound_offset" plus (CtbSizeY/MinCbSizeY)+2 can indicate the offset used for computing the horizontal wrap-around position in units of "MinCbSizeY" luma samples. The value of "sps_ref_wraparound_offset" can be in the range of 0 to (pic_width_in_luma_samples/MinCbSizeY)−(CtbSizeY/MinCbSizeY)−2, inclusive, where pic_width_in_luma_samples is the value of pic_width_in_luma_samples in any PPS that refers to the SPS.

As stated above, another issue with the conventional design is that even if one picture in the video sequence has a dimension that breaks the conformance requirement, wrap-around MC is disabled for all pictures in the video sequence. In some embodiments, the constraint on the syntax element value is removed. A controlling flag of wrap-around motion compensation sps_ref_wraparound_enabled_flag is firstly signaled in SPS. In some embodiments, if sps_ref_wraparound_enabled_flag is true, the offset value sps_ref_wraparound_offset_minus1 is signaled.

FIG. 11 shows semantics of an example sequence parameter set for improved wrap-around motion compensations with a maximum picture width, according to some embodiments of the present disclosure. As shown in FIG. 11, changes from the previous VVC are shown in italic, and with proposed deleted semantics being further shown in strikethrough.

In some embodiments, as shown in FIG. 11, "sps_ref_wraparound_enabled_flag" can indicate whether the horizontal wrap-around motion compensation is applied in inter prediction. For example, a value of 1 can indicate that the horizontal wrap-around motion compensation may be applied in inter prediction, and a value of 0 can indicate that the horizontal wrap-around motion compensation is not applied.

In some embodiments, as shown in FIG. 11, "sps_ref_wraparound_offset_minus1" plus 1 can indicate a maximum value of the offset used for computing the horizontal wrap-around position in units of "MinCbSizeY" luma samples. In some embodiments, the value of "sps_ref_wraparound_offset_minus1" is in a range of (CtbSizeY/MinCbSizeY)+1 to (pic_width_max_in_luma_samples/MinCbSizeY)−1, inclusive.

In some embodiments, "pic_width_max_in_luma_samples" is a maximum width, in units of luma samples, of each decoded picture referring to the SPS.

In some embodiments, for each picture of the sequence, two variables "PicRefWraparoundEnableFlag" and "PicRefWraparoundOffset" can be defined. FIG. 12 shows example derivations of variables "PicRefWraparoundEnableFlag" and "PicRefWraparoundOffset," according to some embodiments of the present disclosure. As shown in FIG. 12, "pic_width_in_luma_samples" can refer to the width of the picture referring to the PPS in which "pic_width_in_luma_samples" is signaled.

In some embodiments, as shown in FIG. 12, the variable "PicRefWraparoundEnableFlag" can be used to determine whether wrap-around MC can be enabled for the current picture. For example, if the value of "PicRefWrapaoundEnableFlag" indicates that the wrap-around MC can be enabled for the current picture, the offset "PicRefWraparoundOffset" to be used in motion compensation process.

FIG. 13 shows example derivations of a sample position used for motion compensation, according to some embodiments of the present disclosure. As shown in FIG. 13, sample position (xInt$_i$, yInt$_i$) refers to a sample location before wrapping around, and sample position (xInt$_i$, yInt$_j$) can be determined. In some embodiments, variable "picW" is equal to variable "pic_width_in_luma_samples." In some embodiments, functions "ClipH" and "Clip3" can be executed according to the equations shown in FIG. 13.

In some embodiments, the wrap-around motion compensation controlling flag can still be signaled in SPS, but the wrap-around motion compensation offset is signaled in PPS instead of SPS. FIG. 14 shows syntax of an example sequence parameter set and picture parameter set for wrap-around motion compensations with a wrap-around motion compensation offset in the picture parameter set, according to some embodiments of the present disclosure. As shown in FIG. 14, changes from the previous VVC are shown in italic, and with proposed deleted syntax being further shown in strikethrough. In some embodiments, as shown in FIG. 14, "sps_ref_wraparound_enabled_flag" is signaled in SPS, and "pps_ref_wraparound_offset_minus1" is signaled in PPS.

FIG. 15 shows semantics of an example sequence parameter set and picture parameter set for wrap-around motion compensation with a wrap-around motion compensation offset in the picture parameter set, according to some embodiments of the present disclosure. As shown in FIG. 15, changes from the previous VVC are shown in italic, and with proposed deleted semantics being further shown in strikethrough. It is appreciated that the semantics shown in FIG. 15 can correspond to the syntax shown in FIG. 14.

In some embodiments, as shown in FIG. 15, "sps_ref_wraparound_enabled_flag" can indicate whether the horizontal wrap-around motion compensation is applied in inter prediction. For example, a value of 1 can indicate that the horizontal wrap-around motion compensation is applied, and a value of 0 can indicate that the horizontal wrap-around motion compastion is not applied.

In some embodiments, as shown in FIG. 15, "pps_ref_wraparound_offset_minus1" plus 1 can indicate the offset used for computing the horizontal wrap-around position in units of "MinCbSizeY" luma samples. In some embodiments, when "sps_ref_wraparound_enabled_flag" is equal to 0 or the value of (CtbSizeY/MinCbSizeY+1) is larger than (pic_width_in_luma_samples/MinCbSizeY−1), "pps_ref_wraparound_offset_minus1" is equal to 0. Otherwise, the value of "pps_ref_wraparound_offset_minus1" is in a range of (CtbSizeY/MinCbSizeY)+1 to (pic_width_in_luma_samples/MinCbSizeY)−1, inclusive.

In some embodiments, for each picture of the sequence, two variables "PicRefWraparoundEnableFlag" and "PicRefWraparoundOffset" can be defined. In some embodiments, "PicRefWraparoundEnableFlag" can be determined as shown in FIG. 12. In some embodiments, "PicRefWraparoundOffset" can be determined as "pps_ref_wraparound_offset_minus1" plus 1.

In some embodiments, during the decoding process, "PicRefWraparoundEnableFlag" and "PicRefWraparoundOffset" can be used for wrap-around motion compensation. For example, the sample position (xInt$_i$, yInt$_i$) used for motion compensation can be derived in ways shown in FIG. 13. As shown in FIG. 13, in some embodiments, variable "picW" can be equal to "pic_width_in_luma_samples."

In some embodiments, the wrap-around motion compensation controlling flag can still be signaled but the wrap-around motion compensation offset is signaled in PPS instead of SPS. Moreover, "pps_ref_wraparound_offset" can also indicate a useage of wrap-around motion compensation for the picture referring to the PPS. FIG. 16 shows syntax of an example sequence parameter set for improved wrap-around motion compensations without a wrap-around motion compensation offset, according to some embodiments of the present disclosure. As shown FIG. 16, changes from the previous VVC are shown in italic, and with proposed deleted syntax being further shown in strikethrough. As shown in FIG. 14, "sps_ref_wraparound_enabled_flag" can be signaled in SPS.

FIG. 17 shows syntax of an example picture parameter set for improved wrap-around motion compensations with a wrap-around motion compensation offset, according to some embodiments of the present disclosure. As shown in FIG. 17, changes from the previous VVC are shown in italic. It is appreciated that the PPS shown in FIG. 17 can correspond to the SPS shown in FIG. 16. As shown in FIG. 17, "pps_ref_wraparound_offset" can be signaled in PPS. In some embodiments, "pps_ref_wraparound_offset" signaled in PPS can also indicate the usage of wrap-around motion compensation for the picture referring to the PPS. In other words, an encoder may disable wrap-around motion compensation in PPS level by setting pps_ref_wraparound_offset to a special value.

FIG. 18 shows semantics of an example sequence parameter set and picture parameter set for improved wrap-around motion compensations with a wrap-around motion compensation offset in the picture parameter set, according to some embodiments of the present disclosure. As shown in FIG. 18, changes from the previous VVC are shown in italic, and with proposed deleted semantics being further shown in strikethrough. It is appreciated that the semantics shown in FIG. 18 can correspond to the syntax shown in FIG. 16 and FIG. 17.

In some embodiments, as shown in FIG. 18, "sps_ref_wraparound_enabled_flag" can indicate whether the horizontal wrap-around motion compensation is applied in inter prediction. For example, a value of 1 can indicate that horizontal wrap-around motion compensation may be applied in inter prediction, and a value of 0 can indicate that horizontal wrap-around motion compensation is not applied.

In some embodiments, as shown in FIG. 18, "pps_ref_wraparound_offset" plus 1 can indicate the value of offset used for computing the horizontal wrap-around position in units of MinCbSizeY luma samples. For example, when "pps_ref_wraparound_offset" is equal to 0, wrap-around motion compensation is disbaled. When "sps_ref_wraparound_enabled_flag" is equal to 0 or the value of (CtbSizeY/MinCbSizeY+1) is larger than (pic_width_in_luma_samples/MinCbSizeY−1), "pps_ref_wraparound_offset" is equal to 0. Otherwise, the value of "pps_ref_wraparound_offset" is in a range of (CtbSizeY/MinCbSizeY)+1 to (pic_width_in_luma_samples/MinCbSizeY)−1, inclusive.

In some embodiments, for each picture of the sequence, two variables "PicRefWraparoundEnableFlag" and "PicRefWraparoundOffset" can be defined. FIG. 19 shows example derivations of variables "PicRefWraparoundEnableFlag" and "PicRefWraparoundOffset," according to some embodiments of the present disclosure.

In some embodiments, during the decoding process, "PicRefWraparoundEnableFlag" and "PicRefWraparoundOffset" can be used for wrap-around motion compensation. For example, the sample position (xInti, yInti) used for motion compensation can be derived in ways shown in FIG. 11. As shown in FIG. 11, in some embodiments, variable "picW" can be equal to "pic_width_in_luma_samples."

In some embodiments, the syntax is changed. The wrap-around motion compensation controlling flag can still be signaled in SPS but the wrap-around motion compensation offset is signaled in PPS instead of SPS. Moreover, a PPS level wrap-around motion compensation controlling flag can also be signaled. FIG. 20 shows syntax of an example sequence parameter set for improved wrap-around motion compensations without a wrap-around motion compensation offset in the sequence parameter set, according to some embodiments of the present disclosure. As shown in FIG. 20, changes from the previous VVC are shown in italic, and with proposed deleted syntax being further shown in strikethrough. As shown in FIG. 20, "sps_ref_wraparound_enabled_flag" can be signaled in SPS.

FIG. 21 shows syntax of an example picture parameter set for improved wrap-around motion compensations with a wrap-around controlling flag, according to some embodiments of the present disclosure. As shown in FIG. 21, changes from the previous VVC are shown in italic. As shown in FIG. 21, "pps_ref_wraparound_enabled_flag" can be signaled in PPS. In some embodiments, if "pps_ref_wraparound_enabled_flag" is true (e.g., the value is equal to 1), "pps_ref_wraparound_offset" can be signaled.

FIG. 22 shows semantics of an example sequence parameter set and picture parameter set for improved wrap-around motion compensations with a wrap-around controlling flag in the picture parameter set, according to some embodiments of the present disclosure. As shown in FIG. 22, changes from the previous VVC are shown in italic, and with proposed deleted semantics being further shown in strikethrough. It is appreciated that the semantics shown in FIG. 22 can correspond to syntax shown in FIG. 20 and FIG. 21.

In some embodiments, as shown in FIG. 22, "sps_ref_wraparound_enabled_flag" can indicate whether the horizontal wrap-around motion compensation is applied in inter prediction. For example, a value of 1 can indicate that horizontal wrap-around motion compensation may be applied in inter prediction, and a value of 0 can indicate that horizontal wrap-around motion compensation is not applied.

In some embodiments, as shown in FIG. 22, "pps_ref_wraparound_enabled_flag" equal to 1 can indicate that horizontal wrap-around motion compensation is applied in inter prediction. "pps_ref_wraparound_enabled_flag" equal to 0 can indicate that horizontal wrap-around motion compensation is not applied. In some embodiments, when "sps_ref_wraparound_enabled_flag" is equal to 0 or the value of (CtbSizeY/MinCbSizeY+1) is larger than (pic_width_in_luma_samples/MinCbSizeY−1), "pps_ref_wraparound_enabled_flag" is equal to 0.

In some embodiments, there is alternative semantics for the sequence parameter set and the picture parameter set as shown in FIG. 22. FIG. 23 shows semantics of an example sequence parameter set and picture parameter set for improved wrap-around motion compensations with a wrap-around controlling flag in the picture parameter set, according to some embodiments of the present disclosure. As shown in FIG. 23, changes from the previous VVC are shown in italic, and with proposed deleted semantics being further shown in strikethrough. It is appreciated that the semantics shown in FIG. 23 can correspond to syntax shown in FIG. 20 and FIG. 21.

In some embodiments, as shown in FIG. 23, "pps_ref_wraparound_enabled_flag" equal to 1 can indicate that horizontal wrap-around motion compensation is applied in inter prediction. "pps_ref_wraparound_enabled_flag" equal to 0 can indicate that horizontal wrap-around motion compensation is not applied. In some embodiments, when "sps_ref_wraparound_enabled_flag" equals to 0 or the value of (CtbSizeY/MinCbSizeY+1) is larger than (pic_width_in_luma_samples/MinCbSizeY−1), "pps_ref_wraparound_enabled_flag" is 0. Otherwise, "pps_ref_wraparound_enabled_flag" is equal to 1.

In some embodiments, as shown in FIG. 23, "pps_ref_wraparound_offset" plus (CtbSizeY/MinCbSizeY)+2 can specify the value of offset used for computing the horizontal wrap-around position in units of MinCbSizeY luma samples. In some embodiments, when present, the value of "pps_ref_wraparound_offset" can be in a range of 0 to (pic_width_in_luma_samples/MinCbSizeY)−(CtbSizeY/MinCbSizeY)−2, inclusive.

In some embodiments, for each picture of the sequence, a variable "PicRefWraparoundOffset" can be defined. For example, "PicRefWraparoundOffset" can be derived as pps_ref_wraparound_offset_minus1+1.

In some embodiments, during the decoding process, variables "pps_ref_wraparound_enabled_flag" and "PicRefWraparoundOffset" can be used for wrap-around motion compensation. FIG. 24 shows an example derivation of variable "PicRefWraparoundOffset," according to some embodiments of the present disclosure. As shown in FIG. 24, variable "PicRefWraparoundOffset" can be derived according to variables "pps_ref_wraparound_offset," "CtbSizeY," and "MinCbSizeY." In some embodiments, variable "PicRefWraparoundOffset" can also be used to determine a sample position (xInt$_i$, yInt$_i$) used for motion compensation, similar to the sample position shown in FIG. 13. As shown in FIG. 13, variable "picW" can be equal to "pic_width_in_luma_samples."

In some embodiments, "sps_ref_wraparound_enabled_flag" can be removed, and "pps_ref_wraparound_enabled_flag" and "pps_ref_wraparound_offset" can be retained.

In some embodiments, the restriction on the value ranges of "sps_ref_wraparound_enabled_flag" and "sps_ref_wraparound_offset_minus1" can be removed, and a restriction on the value range of the picture size signaled in SPS and PPS can be added. Moreover, there many not be any syntax changes. FIG. 25 shows semantics of an example sequence parameter set and picture parameter set for improved wrap-around motion compensations with a restriction on a picture size, according to some embodiments of the present disclosure. As shown in FIG. 25, changes from the previous VVC are shown in italic, and with proposed deleted semantics being further shown in strikethrough.

In some embodiments, as shown in FIG. 25, "pic_width_max_in_luma_samples" can indicate a maximum width, in units of luma samples, of each decoded picture referring to the SPS. In some embodiments, "pic_width_max_in_luma_samples" may not be equal to 0 and may be an integer multiple of max (8, MinCbSizeY).

In some embodiments, as shown in FIG. 25, "pic_height_max_in_luma_samples" can indicate a maximum height, in units of luma samples, of each decoded picture referring to the SPS. In some embodiments, "pic_height_max_in_luma_samples" may not be equal to 0 and may be an integer multiple of max (8, MinCbSizeY).

In some embodiments, as shown in FIG. 25, "sps_ref_wraparound_enabled_flag" equal to 1 can indicate that horizontal wrap-around motion compensation is applied in inter prediction, and "sps_ref_wraparound_enabled_flag" equal to 0 can indicate that horizontal wrap-around motion compensation is not applied.

In some embodiments, "sps_ref_wraparound_offset_minus1" plus 1 can indicate an offset used for computing the horizontal wrap-around position in units of "MinCbSizeY" luma samples. In some embodiments, the value of "sps_ref_wraparound_offset_minus1" is larger than or equal to (CtbSizeY/MinCbSizeY)+1.

In some embodiments, a restriction can be imposed for "pic_width_max_in_luma_samples," "CtbSizeY," and "MinCbSizeY." FIG. 26 shows semantics of an example sequence parameter set for improved wrap-around motion compensations with restrictions imposed on variables "pic_width_max_in_luma_samples," "CtbSizeY," and "MinCbSizeY," according to some embodiments of the present disclosure. As shown in FIG. 26, changes from the previous VVC are shown in italic, and with proposed deleted semantics being further shown in strikethrough.

In some embodiments, a restriction can be imposed for "pic_width_in_luma_samples," which is signaled in PPS. FIG. 27 shows semantics of an example picture parameter set for improved wrap-around motion compensations with restrictions imposed on variable "pic_width_in_luma_samples," according to some embodiments of the present disclosure. As shown in FIG. 27, changes from previous VVC are shown in italic, and with proposed deleted semantics being further shown in strikethrough.

In some embodiments, methods shown as in FIGS. 9-11 can be combined with any of the methods shown in FIGS. 11-27. As a specified value is subtracted from the wrap-around motion compensation offset before wrap-around motion compensation offset is signaled (e.g., method shown in FIGS. 9-10) to reduce signalling cost, when the methods are combined, the range restriction of wrap-around motion compensation offset signaled in the bistream can also be changed. For example, the same specified value can be subtracted from both upper bound and lower bound. Moreover, if the lower bound after substraction is zero, it may be removed since it is guaranteed that the offset singaled in bitstream is a non-negative value in the VVC standard (e.g., VVC draft 7).

Figure 28:
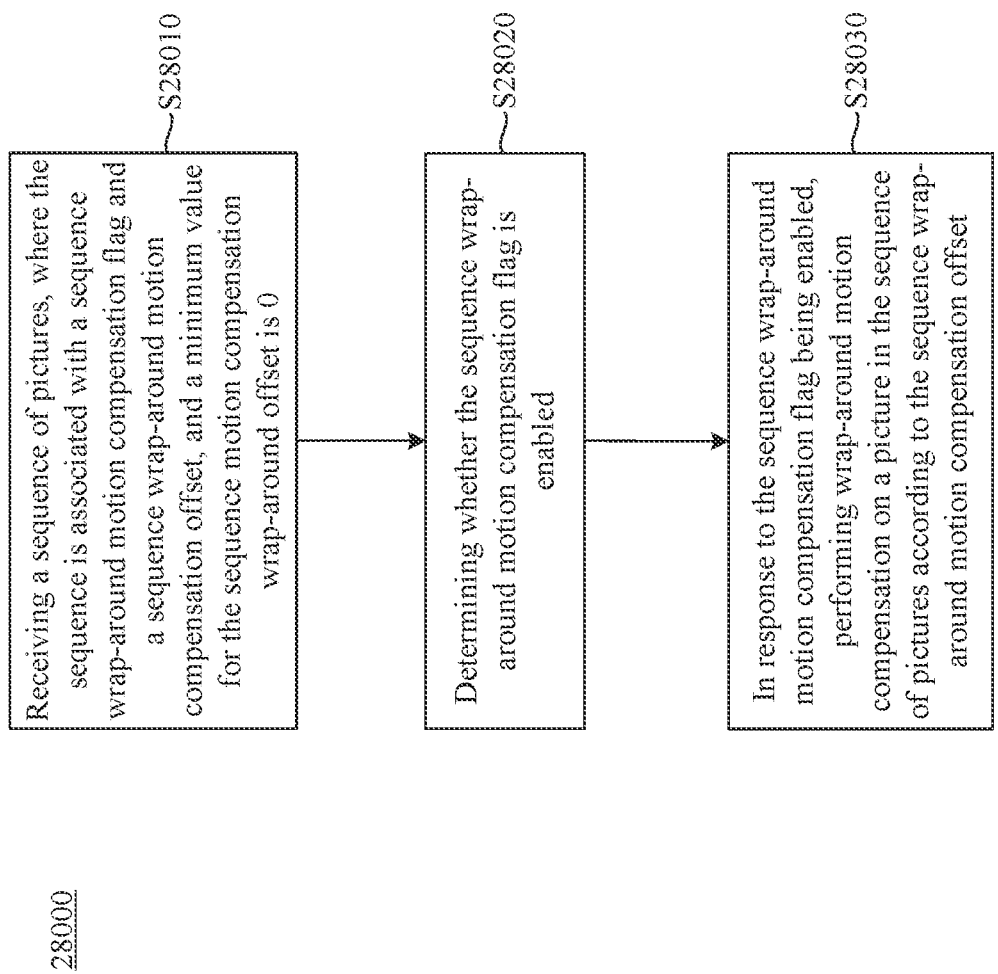
FIG. 28 shows a flowchart of an example method for performing motion compensations, according to some embodiments of the present disclosure.

Embodiments of the present disclosure further methods for performing motion compensations. FIG. 28 shows a flowchart of an example method for performing motion compensations, according to some embodiments of the present disclosure. It is appreciated that method 28000 shown in FIG. 28 can be executed according to the syntax and semantics shown in FIG. 9 and FIG. 10.

In step S28010, a sequence of pcitures are received. The seuqence is associated with a sequence wrap-around motion compensation flag and a sequence wrap-around motion compensation offset. A minimum value for the sequence motion compensation wrap-around motion compensation offset is 0. For example, as shown in FIG. 9, to save the bits dedicated on the wrap-around motion compensation offset, (CtbSizeY/MinCbSizeY)+2 can be subtracted from wrap-around motion compensation offset before wrap-around motion compensation offset is signaled. As a result, the smallest value of this syntax element can be 0.

In step S28020, it is determined whether the sequence wrap-around motion compensation flag is enabled.

In step S28030, in response to the sequence wrap-around motion compensation flag being enabled, a wrap-around motion compensation is performed on a picture in the sequence of pictures according to the sequence wrap-around motion compensation offset. In some embodiments, the motion compensation is performed according to the VVC standard.

Figure 29:
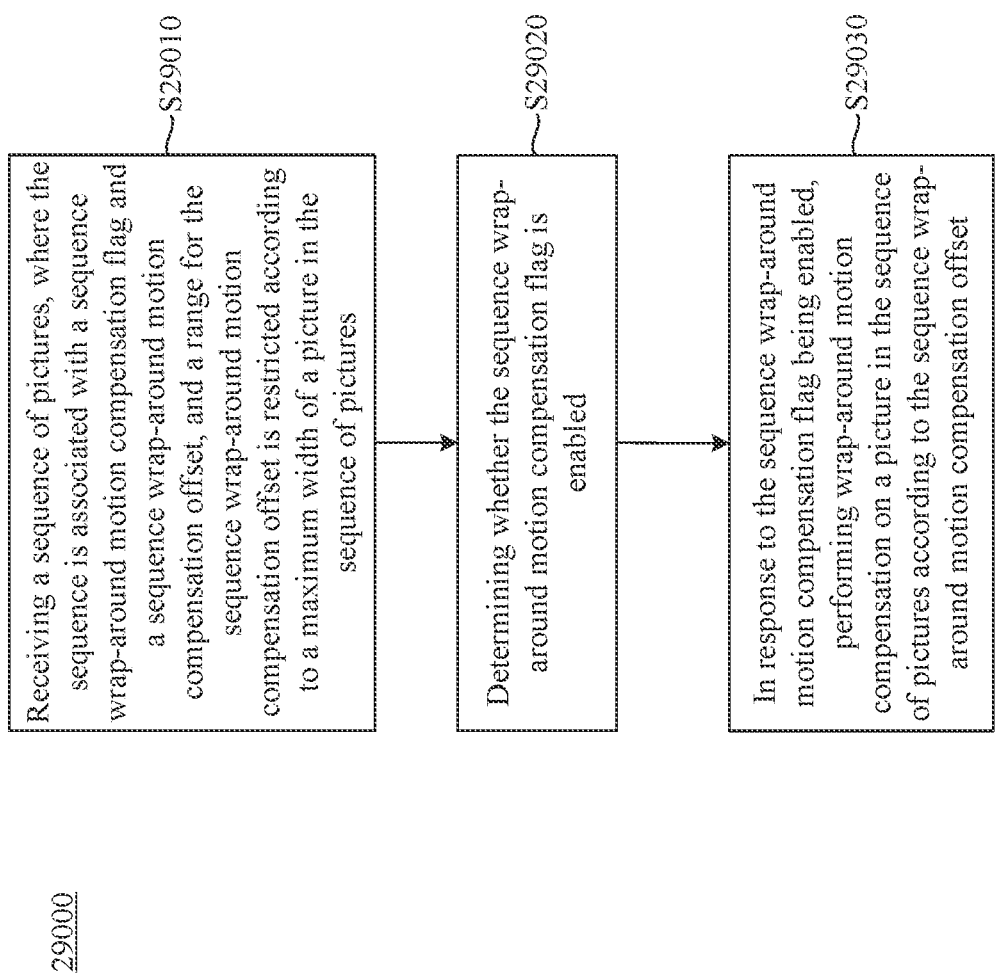
FIG. 29 shows a flowchart of an example method for performing motion compensations with a restricted range for a sequence wrap-around motion compensation offset, according to some embodiments of the present disclosure.

Embodiments of the present disclosure further methods for performing motion compensations with a restricted range for the sequence wrap-around motion compensation offset. FIG. 29 shows a flowchart of an example method for performing motion compensations with a restricted range for a sequence wrap-around motion compensation offset, according to some embodiments of the present disclosure. It is appreciated that method 29000 shown in FIG. 29 can be executed according to the semantics shown in FIG. 11.

In step S29010, a sequence of pcitures are received. The seuqence is associated with a sequence wrap-around motion compensation flag and a sequence wrap-around motion compensation offset. A range for the sequence wrap-around motion compenstaion offset is restricted according to a maximum width of a picture in the sequence of pictures. For example, as shown in FIG. 11, "pic_width_max_in_luma_samples" can represent a maximum width, in units of luma samples, of each decoded picture referring to the SPS. The value of "sps_ref_wraparound_offset_minus1" can be in a range of (CtbSizeY/MinCbSizeY)+1 to (pic_width_max_in_luma_samples/MinCbSizeY)−1, inclusive.

In step S29020, it is determined whether the sequence wrap-around motion compensation flag is enabled.

In step S29030, in response to the sequence wrap-around motion compensation flag being enabled, a wrap-around motion compensation is performed on a picture in the sequence of pictures according to the sequence wrap-around motion compensation offset. In some embodiments, the motion compensation is performed according to the VVC standard. In some embodiments, the warp-around motion compensation can be performed on a plurality of pictures in the sequence of pictures, and the plurality of pictures can have different sizes. In some embodiments, the wrap-around motion compensation on the picture is performed according to the sequence wrap-around motion compensation offset in response to a picture wrap-around enable flag being enabled. The picture wrap-around enable flag can be determined according to the sequence wrap-around motion compensation flag. For example, as shown in FIG. 12, the picture wra-around enable flag can be determined from the equation that includes the variable "sps_ref_wraparound_enabled_flag."

Figure 30:
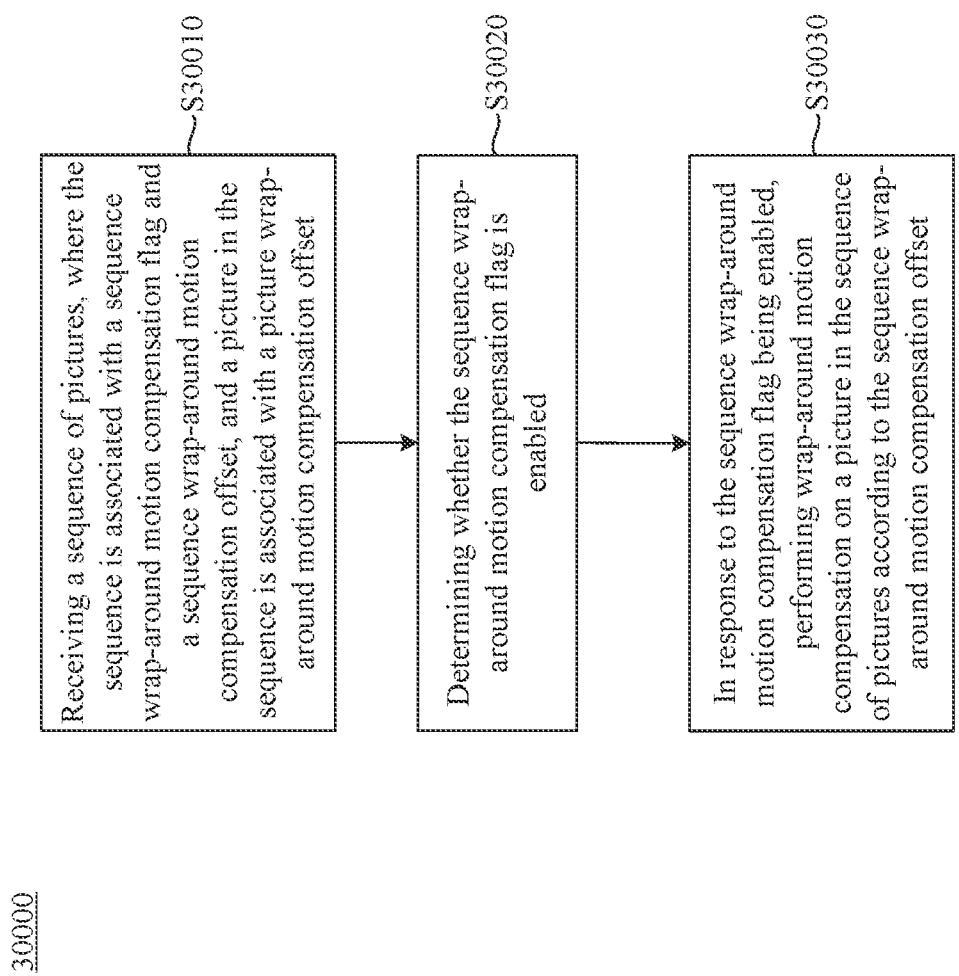
FIG. 30 shows a flowchart of an example method for performing motion compensations with a picture associated with a sequence wrap-around motion compensation offset, according to some embodiments of the present disclosure.

Embodiments of the present disclosure further methods for performing motion compensations with a picture associated with the sequence wrap-around motion compensation offset. FIG. 30 shows a flowchart of an example method for performing motion compensations with a picture associated with a sequence wrap-around motion compensation offset, according to some embodiments of the present disclosure. It is appreciated that method 30000 shown in FIG. 30 can be executed according to the syntax and the semantics shown in FIG. 14 and FIG. 15.

In step S30010, a sequence of pcitures are received. The seuqence is associated with a sequence wrap-around motion compensation flag, and a picture in the sequence is associated with a picture wra-around motion compensation offset. For example, as shown in FIG. 14, a new variable "pps_ref_wraparound_offset" can be included in the picture parameter set.

In step S30020, it is determined whether the sequence wrap-around motion compensation flag is enabled.

In step S30030, in response to the sequence wrap-around motion compensation flag being enabled, a wrap-around motion compensation is performed on a picture in the sequence of pictures according to the sequence wrap-around motion compensation offset. In some embodiments, the motion compensation is performed according to the VVC standard. In some embodiments, the warp-around motion compensation can be performed on a plurality of pictures in the sequence of pictures, and the plurality of pictures can have different sizes.

In some embodiments, the wrap-around motion compensation on the picture is performed according to the sequence wrap-around motion compensation offset in response to a picture wrap-around enable flag being enabled. The picture wrap-around enable flag can be determined according to the sequence wrap-around motion compensation flag. For example, as shown in FIG. 12, the picture wra-around enable flag can be determined from the equation that includes the variable "sps_ref_wraparound_enabled_flag." In some embodiments, a minimum value of the picture wrap-around motion compensation offset is 0. For example, as shown in FIG. 18, a minimum value for the variable "pps_ref_wraparound_offset" can be 0.

In some embodiments, the picture is associated with a picture wrap-around motion compensation flag. In response to the picture wrap-around motion compensation flag being enabled, the wrap-around motion compensation can be performed on the picture according to the picture wrap-around motion compensation offset. For example, as shown in FIG. 21, a new variable "pps_ref_wraparound_enabled_flag" can be added in the picture parameter set. As shown in FIG. 22, variable "pps_ref_wraparound_enabled_flag" can indicate whether the horizontal wrap-around motion compensation is to be applied on a picture level. In some embodiments, in response to the picture wrap-around motion compensation flag being enabled, the picture wrap-around motion compensation offset can be signaled.

Embodiments of the present disclosure further methods for performing motion compensations with a restricted maximum size of the picture. FIG. 31 shows a flowchart of an example method for performing motion compensations with a restricted maximum picture size, according to some embodiments of the present disclosure. It is appreciated that method 31000 shown in FIG. 31 can be executed according to the the semantics shown in FIG. 25.

In step S31010, a sequence of pcitures are received. The seuqence is associated with a sequence wrap-around motion compensation flag, and a picture in the sequence is associated with a picture wra-around motion compensation offset.

In step S31020, it is determined whether the sequence wrap-around motion compensation flag is enabled.

In step S31030, in response to the sequence wrap-around motion compensation flag being enabled, a wrap-around motion compensation is performed on a picture in the sequence of pictures according to the sequence wrap-around motion compensation offset. A maximum size of the picture is restricted to a minimum value according to the sequence wrap-around motion compensation offset. For example, as shown in FIG. 26, the maximum picture width can be determined according to equations that includes "sps_ref_wraparound_offset_minus1." In some embodiments, the motion compensation is performed according to the VVC standard. In some embodiments, the warp-around motion compensation can be performed on a plurality of pictures in the sequence of pictures, and the plurality of pictures can have different sizes. In some embodiments, the size of the picture is restricted to a minimum value according to the sequence wrap-around motion compensation offset. For example, as shown in FIG. 27, the picture width can be determined according to equations that includes "sps_ref_wraparound_offset_minus1."

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

The embodiments may further be described using the following clauses:

1. A method for performing motion compensation, comprising:
   receiving a first wrap-around motion compensation flag, wherein the first wrap-around motion compensation flag is associated with a picture;
   determining whether the first wrap-around motion compensation flag is enabled;
   in response to a determination that the first wrap-around motion compensation flag is enabled, receiving a wrap-around motion compensation offset, wherein the wrap-around motion compensation offset is associated with the picture; and
   performing motion compensation on the picture according to the first wrap-around motion compensation flag and the wrap-around motion compensation offset.

2. The method according to clause 1, further comprising:
   receiving a second wrap-around motion compensation flag, wherein the first wrap-around motion compensation flag is associated with a set of pictures comprising the picture associated with the first wrap-around motion compensation flag;
   determining whether the second wrap-around motion compensation flag is disabled; and
   in response to a determination that the second wrap-around motion compensation flag is disabled, determining that the first wrap-around motion compensation flag is also disabled.

3. The method according to clause 2, wherein determining whether the first wrap-around motion compensation flag is enabled further comprises:
   determining a picture width of the picture associated with the first wrap-around motion compensation flag; and
   determining whether the first wrap-around motion compensation flag is enabled based on the picture width.

4. The method according to clause 3, further comprising:
   determining whether a luma coding tree block size in unit of minimum coding block plus 1 is greater than the picture width of the picture in unit of minimum coding block minus 1; and
   in response to a determination that the luma coding tree block size in unit of minimum coding block plus 1 is greater than the picture width of the picture in unit of minimum coding block minus 1, determining the first motion compensation flag is disabled.

5. The method according to any one of clauses 2-4, further comprising:
   determining whether the second wrap-around motion compensation flag is enabled; and
   in response to the determination that the second wrap-around motion compensation flag is enabled, determining a picture width of the picture is larger than or equal to a luma coding tree block size plus an offset.

6. The method according to clause 5, further comprising:
   in response to the determination that the second wrap-around motion compensation flag is enabled, determining the luma coding tree block size in unit of minimum coding block plus 1 is less than or equal to the picture width of the picture in unit of minimum coding block minus 1.

7. The method according to any one of clauses 2-6, wherein:
   the second wrap-around motion compensation flag is signaled in a sequence parameter set, and the first wrap-around motion compensation flag and the wrap-around motion compensation offset are signaled in a picture parameter set.

8. The method according to any one of clauses 1-7, wherein the motion compensation is performed according to versatile video coding standard.

9. The method according to any one of clauses 1-8, further comprising:
   performing motion compensation on a plurality of pictures, wherein the plurality of pictures have different sizes.

10. The method according to any one of clauses 1-9, wherein performing motion compensation on the picture according to the wrap-around motion compensation offset further comprises:
    determining a second wrap-around motion compensation offset by adding an offset to the wrap-around motion compensation offset received from the bitstream; and
    performing motion compensation on the picture according to the second wrap-around motion compensation offset.

11 A system for performing motion compensation, the system comprising:
    a memory storing a set of instructions; and
    a processor configured to execute the set of instructions to cause the system to perform:
        receiving a first wrap-around motion compensation, wherein the first wrap-around motion compensation offset is associated with a picture i;
        determining whether the first wrap-around motion compensation flag is enabled;

in response to a determination that the first wrap-around motion compensation flag is enable, receiving a wrap-around motion compensation offset, wherein the wrap-around motion compensation offset is associated with the picture; and performing motion compensation on the picture according to the first wrap-around motion compensation flag and the wrap-around motion compensation offset.

12. The system according to clause 11, wherein the processor is further configured to execute the set of instructions to cause the system to perform:

receiving a second wrap-around motion compensation flag, wherein the second wrap-around motion compensation flag is associated with a set of pictures comprising the picture associated with the first wrap-around motion compensation flag;

determining whether the second wrap-around motion compensation flag is disabled; and in response to a determination that the second wrap-around motion compensation flag is disabled, determining that the first wrap-around motion compensation flag is also disabled.

13. The system according to clause 12, wherein the processor is further configured to execute the set of instructions to cause the system to perform:

determining a picture width of the picture associated with the first wrap-around motion compensation flag; and determining whether the first wrap-around motion compensation flag is enabled based on the picture width.

14. The system according to clause 13, wherein the processor is further configured to execute the set of instructions to cause the system to perform:

determining whether a luma coding tree block size in unit of minimum coding block plus 1 is greater than the picture width of the picture in unit of minimum coding block minus 1; and in response to a determination that the luma coding tree block size in unit of minimum coding block plus 1 is greater than the picture width of the picture in unit of minimum coding block minus 1, determining the first motion compensation flag is disabled.

15. The system according to any one of clauses 12-14, wherein the processor is further configured to execute the set of instructions to cause the system to perform:

determining whether the second wrap-around motion compensation flag is enabled; and in response to the determination that the second wrap-around motion compensation flag is enabled, determining a picture width of the picture is larger than or equal to a luma coding tree block size plus an offset.

16. The system according to clause 15, wherein the processor is further configured to execute the set of instructions to cause the system to perform:

in response to the determination that the second wrap-around motion compensation flag is enabled, determining the luma coding tree block size in unit of minimum coding block plus 1 is less than or equal to the picture width of the picture in unit of minimum coding block minus 1.

17. The system according to any one of clauses 12-16, wherein:

the second wrap-around motion compensation flag is signaled in a sequence parameter set, and the first wrap-around motion compensation flag and the wrap-around motion compensation offset are signaled in a picture parameter set.

18. The system according to any one of clauses 11-17, wherein the processor is further configured to execute the set of instructions to cause the system to perform:

performing motion compensation on a plurality of pictures, wherein the plurality of pictures have different sizes.

19. The system according to any one of clauses 11-18, wherein the processor is further configured to execute the set of instructions to cause the system to perform:

determining a second wrap-around motion compensation offset by adding an offset to the wrap-around motion compensation offset received from the bitstream; and performing motion compensation on the picture according to the second wrap-around motion compensation offset.

20. A non-transitory computer readable medium that stores a set of instructions that is executable by one or more processors of an apparatus to cause the apparatus to initiate a method for performing motion compensation, the method comprising:

receiving a first wrap-around motion compensation flag, wherein the first wrap-around motion compensation flag is associated with a picture in a set of pictures;

determining whether the first wrap-around motion compensation flag is enabled;

in response to a determination that the first wrap-around motion compensation flag is enabled, receiving a wrap-around motion compensation offset, wherein the wrap-around motion compensation offset is associated with the picture; and performing motion compensation on the picture according to the first wrap-around motion compensation flag and the wrap-around motion compensation offset.

21. The non-transitory computer readable medium according to clause 20, wherein the set of instructions is executable by the at least one processor of the computer system to cause the computer system to further perform:

determining a picture width of the picture associated with the first wrap-around motion compensation flag; and determining whether the first wrap-around motion compensation flag is enabled based on the picture width.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method for decoding a video, comprising:

receiving a first wrap-around motion compensation flag associated with one or more pictures indicating whether a horizontal wrap-around is enabled or disabled for the one or more picture; and determining whether the first wrap-around motion compensation flag is equal to a first value or a second value based on a luma coding tree block size, wherein determining whether the first wrap-around motion compensation flag is equal to the first value or the second value based on the luma coding tree block size further comprises:

when the luma coding tree block size in unit of minimum coding block plus 1 is greater than a picture width in unit of minimum coding block minus 1, determining the first wrap-around motion compensation flag is equal to the second value;

wherein the first wrap-around motion compensation flag being equal to the first value indicates that a horizontal wrap-around motion compensation is enabled and the first wrap-around motion compensation flag being equal to the second value indicates that the horizontal wrap-around motion compensation is disabled.

2. The method according to claim 1, further comprising:
receiving a second wrap-around motion compensation flag associated with a sequence of pictures indicating whether a horizontal wrap-around is enabled or disabled for the sequence of pictures; and
determining whether the first wrap-around motion compensation flag is equal to the first value or the second value based on the second wrap-around motion compensation flag, wherein determining whether the first wrap-around motion compensation flag is equal to the first value or the second value based on the second wrap-around motion compensation flag further comprises:
when the second wrap-around motion compensation flag is equal to the second value, determining the first wrap-around motion compensation flag equal to the second value; or
when the second wrap-around motion compensation flag is equal to the first value and the luma coding tree block size in unit of minimum coding block plus 1 is equal to or less than the picture width in unit of minimum coding block minus 1, determining that the first wrap-around motion compensation flag is equal to the first value;
wherein the second wrap-around motion compensation flag being equal to the first value indicates that the horizontal wrap-around motion compensation is enabled and the second wrap-around motion compensation flag being equal to the second value indicates that the horizontal wrap-around motion compensation is disabled.

3. The method according to claim 2, wherein the first wrap-around motion compensation flag is signaled in a picture parameter set, and second wrap-around motion compensation flag is signaled in a sequence parameter set.

4. The method according to claim 2, further comprising:
in response to a determination that the first wrap-around motion compensation flag is equal to the first value, receiving a parameter associated with a wrap-around motion compensation offset being associated with the one or more pictures.

5. The method according to claim 4, wherein a value of the parameter associated with the wrap-around motion compensation offset is less than or equal to a difference minus 2, and the difference is obtained by the picture width in unit of minimum coding block minus the luma coding tree block size in unit of minimum coding block.

6. The method according to claim 4, wherein the parameter associated with the wrap-around motion compensation offset is signaled in a picture parameter set.

7. The method according to claim 4, further comprises:
determining a second parameter associated with a second wrap-around motion compensation offset by adding an offset to the parameter associated with the wrap-around motion compensation offset received from a bitstream; and
performing motion compensation on the one or more pictures according to the second parameter associated with the second wrap-around motion compensation offset.

8. A method for encoding a video, comprising:
signaling a first wrap-around motion compensation flag associated with one or more pictures indicating whether a horizontal wrap-around is enabled or disabled for the one or more picture; and
determining whether the first wrap-around motion compensation flag is equal to a first value or a second value based on a luma coding tree block size, wherein determining whether the first wrap-around motion compensation flag is equal to the first value or the second value based on the luma coding tree block size further comprises:
when the luma coding tree block size in unit of minimum coding block plus 1 is greater than a picture width in unit of minimum coding block minus 1, determining the first wrap-around motion compensation flag is equal to the second value;
wherein the first wrap-around motion compensation flag equal to the first value indicates a horizontal wrap-around motion compensation is enabled and the first wrap-around motion compensation flag equal to the second value indicates the horizontal wrap-around motion compensation is disabled.

9. The method according to claim 8, further comprising:
signaling a second wrap-around motion compensation flag associated with a sequence of pictures indicating whether a horizontal wrap-around is enabled or disabled for the sequence of pictures; and
determining whether the first wrap-around motion compensation flag is equal to the first value or the second value based on the second wrap-around motion compensation flag, wherein determining whether the first wrap-around motion compensation flag is equal to the first value or the second value based on the second wrap-around motion compensation flag further comprises:
when the second wrap-around motion compensation flag is equal to the second value, determining the first wrap-around motion compensation flag equal to the second value; or
when the second wrap-around motion compensation flag is equal to the first value and the luma coding tree block size in unit of minimum coding block plus 1 is equal to or less than the picture width in unit of minimum coding block minus 1, determining the first wrap-around motion compensation flag is equal to the first value;
wherein the second wrap-around motion compensation flag equal to the first value indicates the horizontal wrap-around motion compensation is enabled and the second wrap-around motion compensation flag equal to the second value indicates the horizontal wrap-around motion compensation is disabled.

10. The method according to claim 9, wherein the first wrap-around motion compensation flag is signaled in a picture parameter set, and second wrap-around motion compensation flag is signaled in a sequence parameter set.

11. The method according to claim 9, further comprising:
in response to a determination that the first wrap-around motion compensation flag is equal to the first value, signaling a parameter associated with a wrap-around motion compensation offset being associated with the one or more pictures.

12. The method according to claim 11, wherein a value of the parameter associated with the wrap-around motion compensation offset is less than or equal to a difference minus 2, and the difference is obtained by the picture width in unit of minimum coding block minus the luma coding tree block size in unit of minimum coding block.

13. The method according to claim 11, wherein the parameter associated with the wrap-around motion compensation offset is signaled in a picture parameter set.

14. The method according to claim 11, further comprises:
    determining a second parameter associated with a second wrap-around motion compensation offset by adding an offset to the parameter associated with the wrap-around motion compensation offset received from a bitstream; and
    performing motion compensation on the one or more pictures according to the second parameter associated with the second wrap-around motion compensation offset.

15. A method of storing of a bitstream into a non-transitory computer readable storage medium, wherein the bitstream is generated by an encoder, the method comprising:
    signaling a first wrap-around motion compensation flag associated with one or more pictures indicating whether a horizontal wrap-around is enabled or disabled for the one or more picture;
    determining whether the first wrap-around motion compensation flag is equal to a first value or a second value based on a luma coding tree block size, wherein determining whether the first wrap-around motion compensation flag is equal to the first value or the second value based on the luma coding tree block size further comprises:
        when the luma coding tree block size in unit of minimum coding block plus 1 is greater than a picture width in unit of minimum coding block minus 1, determining the first wrap-around motion compensation flag equal to the second value;
    wherein the first wrap-around motion compensation flag being equal to the first value indicates that a horizontal wrap-around motion compensation is enabled and the first wrap-around motion compensation flag being equal to the second value indicates that the horizontal wrap-around motion compensation is disabled.

16. The method according to claim 15, further comprising:
    signaling a second wrap-around motion compensation flag associated with a sequence of pictures indicating whether a horizontal wrap-around is enabled or disabled for the sequence of pictures; and
    determining whether the first wrap-around motion compensation flag is equal to the first value or the second value based on the second wrap-around motion compensation flag, wherein determining whether the first wrap-around motion compensation flag is equal to the first value or the second value based on the second wrap-around motion compensation flag further comprises:
        when the second wrap-around motion compensation flag is equal to the second value, determining the first wrap-around motion compensation flag equal to the second value; or
        when the second wrap-around motion compensation flag is equal to the first value and the luma coding tree block size in unit of minimum coding block plus 1 is equal to or less than the picture width in unit of minimum coding block minus 1, determining the first wrap-around motion compensation flag equal to the first value;
    wherein the second wrap-around motion compensation flag being equal to the first value indicates that the horizontal wrap-around motion compensation is enabled and the second wrap-around motion compensation flag being equal to the second value indicates that the horizontal wrap-around motion compensation is disabled.

17. The method according to claim 16, wherein the first wrap-around motion compensation flag is signaled in a picture parameter set, and second wrap-around motion compensation flag is signaled in a sequence parameter set.

18. The method according to claim 16, further comprising:
    in response to a determination that the first wrap-around motion compensation flag is equal to the first value, signaling a parameter associated with a wrap-around motion compensation offset being associated with the one or more pictures.

19. The method according to claim 18, wherein a value of the parameter associated with the wrap-around motion compensation offset is less than or equal to a difference minus 2, and the difference is obtained by the picture width in unit of minimum coding block minus the luma coding tree block size in unit of minimum coding block.

20. The method according to claim 18, wherein the parameter associated with the wrap-around motion compensation offset is signaled in a picture parameter set.

* * * * *